(12) United States Patent
Motoshiromizu et al.

(10) Patent No.: US 10,850,485 B2
(45) Date of Patent: Dec. 1, 2020

(54) POLYESTER RESIN COMPOSITION AND PRODUCTION METHOD THEREOF

(71) Applicant: Toray Industries, Inc., Tokyo (JP)

(72) Inventors: Takahiro Motoshiromizu, Mishima (JP); Jun Sakamoto, Mishima (JP); Kouichi Dan, Mishima (JP); Hiroji Kojima, Mishima (JP); Mayumi Matsumoto, Mishima (JP); Ken Suzuki, Mishima (JP); Tomonori Kawakami, Otsu (JP)

(73) Assignee: Toray Industries, Inc., Tokyo (JP)

( * ) Notice: Subject to any disclaimer, the term of this patent is extended or adjusted under 35 U.S.C. 154(b) by 58 days.

(21) Appl. No.: 15/566,570

(22) PCT Filed: Mar. 22, 2016

(86) PCT No.: PCT/JP2016/058983
§ 371 (c)(1),
(2) Date: Oct. 13, 2017

(87) PCT Pub. No.: WO2016/167084
PCT Pub. Date: Oct. 20, 2016

(65) Prior Publication Data
US 2018/0126714 A1     May 10, 2018

(30) Foreign Application Priority Data

Apr. 15, 2015 (JP) ................. 2015-083563
Jun. 30, 2015 (JP) ................. 2015-131157
Jul. 29, 2015 (JP) ................. 2015-149442
Jul. 29, 2015 (JP) ................. 2015-149443
Nov. 4, 2015 (JP) ................. 2015-216771

(51) Int. Cl.
*C08L 67/00* (2006.01)
*C08G 63/183* (2006.01)
*C08J 5/18* (2006.01)
*C08K 3/32* (2006.01)
*B32B 27/36* (2006.01)
*C08G 63/80* (2006.01)
*C08G 63/88* (2006.01)
*C08K 3/08* (2006.01)
*C08L 67/03* (2006.01)

(52) U.S. Cl.
CPC ............ *B32B 27/36* (2013.01); *C08G 63/183* (2013.01); *C08G 63/80* (2013.01); *C08G 63/88* (2013.01); *C08J 5/18* (2013.01); *C08K 3/08* (2013.01); *C08K 3/32* (2013.01); *C08L 67/00* (2013.01); *C08L 67/03* (2013.01); *C08K 2003/085* (2013.01); *C08K 2003/324* (2013.01)

(58) Field of Classification Search
CPC ............. C08L 101/00; C08L 2201/04; C08L 2666/02; C08L 67/00; C08L 23/06; C08L 23/12; C08L 23/14; C08L 67/02; C08L 77/02; C08L 55/02; C08L 87/005; C08L 67/03; C09K 3/16; C08K 5/0075; C08K 5/19; C08K 5/3415; C08K 2003/085; C08K 2003/324; C08K 3/08; C08K 3/32; C08G 63/183; C08G 63/80; C08G 63/88; C08J 5/18; B32B 27/36
See application file for complete search history.

(56) References Cited

U.S. PATENT DOCUMENTS

| | | | | |
|---|---|---|---|---|
| 3,188,363 A | * | 6/1965 | Amidon ............... | C08K 5/34 525/14 |
| 3,446,766 A | * | 5/1969 | Taylor ............... | C08K 5/098 525/437 |
| 3,887,749 A | * | 6/1975 | Pullum ............... | C08J 5/06 442/136 |

(Continued)

FOREIGN PATENT DOCUMENTS

| | | |
|---|---|---|
| JP | 10-265673 A | 10/1998 |
| JP | 10-265674 A | 10/1998 |

(Continued)

OTHER PUBLICATIONS

Junyan Dou et al "Synthesis of poly(ethylene terephthalate) in benzyl imidazolium ionic liquids", Published online in Wiley Online LibraryMay 10, 2012 (Year: 2012).*

(Continued)

*Primary Examiner* — Ling Siu Choi
*Assistant Examiner* — Gennadiy Mesh
(74) *Attorney, Agent, or Firm* — DLA Piper LLP (US)

(57) ABSTRACT

A polyester resin composition including an ionic liquid that can dissolve an acid component monomer and/or oligomers of a polyester terephthalate, and a copper element that exhibits a reduced amount of production of the acid component monomer and/or oligomers of the polyester. Examples of the ionic liquid include 1-butyl-3-methylimidazolium acetate, 1-butyl-3-methylimidazolium chloride and tetrabutyl ammonium bromide. In one polyester resin composition, the surface roughness Ra of a capture plate is less than 0.150 μm, as measured when a sample of the polyester resin composition is melt at 300° C. for 60 minutes under a nitrogen atmosphere, quickly cooled and thermally treated at 220° C. for 8 hours to form scattered products which are then attached to the capture plate and a gelation ratio after a 6-hour melting treatment at 300° C. under an atmosphere with an oxygen concentration of 1% is 5% or less.

4 Claims, No Drawings

(56) References Cited

U.S. PATENT DOCUMENTS

| | | | |
|---|---|---|---|
| 7,048,994 B2* | 5/2006 | Kosuge | B32B 27/20 |
| | | | 428/220 |
| 2005/0095379 A1* | 5/2005 | Hayakawa | B29C 59/12 |
| | | | 428/35.1 |
| 2009/0234053 A1* | 9/2009 | Ergungor | C08L 67/02 |
| | | | 524/176 |
| 2009/0255226 A1* | 10/2009 | Kohli | B01D 39/1623 |
| | | | 55/379 |
| 2011/0313102 A1* | 12/2011 | Kojima | C08G 63/87 |
| | | | 524/706 |
| 2012/0184706 A1* | 7/2012 | Fradet | C08G 63/81 |
| | | | 528/274 |
| 2012/0283367 A1* | 11/2012 | Minder | C08K 5/3415 |
| | | | 524/106 |
| 2018/0126714 A1* | 5/2018 | Motoshiromizu | C08G 63/183 |

FOREIGN PATENT DOCUMENTS

| | | | |
|---|---|---|---|
| JP | 11-106491 A | | 4/1999 |
| JP | 2009-280710 | * | 12/2009 |
| JP | 2009-280710 A | | 12/2009 |
| JP | 2010-121065 A | | 6/2010 |
| JP | 2010-196007 A | | 9/2010 |
| JP | 2010-265459 A | | 11/2010 |
| JP | 2013-501086 A | | 1/2013 |
| JP | 2013-144777 A | | 7/2013 |
| JP | 2013-244673 A | | 12/2013 |
| JP | 2014-001266 A | | 1/2014 |
| JP | 2014-159593 A | | 9/2014 |
| WO | 2013/005823 A1 | | 1/2013 |

OTHER PUBLICATIONS

Reckmann et al "Poly(ethylene Terephthalate)—polymerization—Mechanism, Catalysts, Kinetics . . . "; Modern polyesters, Chapter II (Year: 2003)—see 2.6 Thermal Degradation.*

Rieckmann et al. Poly(Ethylene Terephthalate) Polymerization; Chapter II. Modern Polyesters: Chemistry and Technology of Polyesters and Copolyesters. (Year: 2003).*

Substantial Examination Report dated Jun. 10, 2020 of counterpart Philippine Application No. 1/2017/501874.

* cited by examiner

POLYESTER RESIN COMPOSITION AND PRODUCTION METHOD THEREOF

TECHNICAL FIELD

This disclosure relates to a polyester resin composition that produces a small amount of an acid component monomer and/or oligomers and the production method thereof.

BACKGROUND

Polyesters are excellent in mechanical properties, thermal properties, chemical resistance, electrical properties and forming properties, and used in various applications. In particular, among polyesters, polyethylene terephthalate (PET) has excellent transparency and processability and, therefore, is used widely in the application that requires high quality, such as an optical film. However, the acid component monomer and/or oligomers that occur due to the polymer decomposition may attach to or deposit on the surface during a forming process, thereby causing surface contamination. In addition, scattering of the acid component monomer and/or oligomers may cause contamination during the process. Thus, a problem arises in the deterioration of the quality of the molded product by surface contamination and contamination during the process. In recent years, the demand of quality in an optical film and the like has been increasing, and a polyester resin has been desired that suppresses the production of the acid component monomer and/or oligomers which, as mentioned above, causes surface contamination and contamination during the process.

WO 2013/005823 and JP 11-106491 A disclose a technique to decrease the monomer content and/or oligomer content in a polyester resin by performing solid phase polymerization. However, since that technique only decreases the monomer content and oligomer content contained in the resin and does not necessarily suppress the production or the deposition of the acid component monomer and/or oligomers during the forming process, the effect was insufficient.

JP 2010-121065 A discloses a polyester that produces a reduced amount of sublimate when melted under the condition of reduced pressure by use of a polymerization catalyst obtained by reacting a phosphonic acid compound and an antimony compound. However, the effect of suppressing the amount of produced sublimate was small, and the decrease of the sublimate produced during the heating at a normal pressure, which becomes problematic during the actual forming process, was not achieved. Thus, the effect was not sufficient to reduce the production and scattering of the acid component monomer and/or oligomers during the forming process.

It could therefore be helpful to provide a polyester resin composition having a decreased production rate of an acid component monomer and/or oligomers of the polyester, and the production method thereof.

SUMMARY

We thus provide:
(1) A polyester resin composition, wherein the surface roughness Ra of a capture plate is less than 0.150 µm as measured when a sample of the polyester resin composition is melt at 300° C. for 60 minutes under a nitrogen atmosphere, quickly cooled and thermally treated at 220° C. for 8 hours to form scattered products which are then attached to the capture plate.
(2) A polyester resin composition, wherein the production rate of an acid component monomer and/or the production rate of oligomers is/are less than 0.70, as defined by formulas (I) and (II):

Production rate of acid component monomer=
(amount of produced acid component monomer)/(acid component monomer content)  (I)

Production rate of oligomers=(amount of produced oligomers)/(oligomer content)  (II).

(3) The polyester resin composition according to (1) or (2), wherein the amount of increase in a cyclic trimer $\Delta C3$ upon melting at 300° C. for 20 minutes is less than 0.30 wt %.
(4) The polyester resin composition according to any one of (1) to (3), wherein formula (III) is satisfied:

$(\Delta COOH/COOH)<3.5$  (III)

wherein $\Delta COOH$ is the amount of increase in COOH terminal groups upon a 4-hour treatment under the conditions of 155° C. and 100% RH.
(5) The polyester resin composition according to (4), comprising an alkali metal phosphate salt.
(6) The polyester resin composition according to any one of (1) to (5), comprising a manganese element.
(7) The polyester resin composition according to any one of (1) to (6), comprising a copper element.
(8) The polyester resin composition according to any one of (1) to (7), wherein the gelation ratio after a 6-hour melting treatment at 300° C. under an atmosphere with an oxygen concentration of 1% is 5% or less.
(9) The polyester resin composition according to any one of (1) to (8), comprising an ionic liquid.
(10) The polyester resin composition according to any one of (1) to (9), comprising an ionic liquid that can dissolve the acid component monomer and/or oligomers of the polyester.
(11) The polyester resin composition according to (9) or (10), wherein the ionic liquid content is 0.01 to 20 wt % based on the polyester resin.
(12) The polyester resin composition according to any one of (2) to (11), wherein the acid component monomer is terephthalic acid, and the oligomer is selected from monohydroxyethyl terephthalate and bishydroxyethyl terephthalate.
(13) The polyester resin composition according to any one of (1) to (12), wherein the amount of COOH terminal groups of the polyester resin composition is 35 eq/t or less.
(14) The polyester resin composition according to any one of (9) to (13), wherein the pKa of a conjugate acid of an anion in the ionic liquid is greater than −10.
(15) The polyester resin composition according to any one of (9) to (14), wherein the anion molecular weight in the ionic liquid is 270 or less.
(16) The polyester resin composition according to any one of (1) to (15), wherein the total light transmittance exceeds 85%.
(17) A method of producing a polyester resin composition, wherein an ionic liquid is added.
(18) The method of producing a polyester resin composition according to (17), wherein a dicarboxylic acid component and a diol component are used to produce a polyester, characterized by adding an ionic liquid between the end of transesterification or esterification reaction and the end of polycondensation reaction.
(19) The method of producing a polyester resin composition according to (17) or (18), wherein, when a dicarboxylic acid component and a diol component are used to cause transesterification or esterification reaction, and then polycondensation reaction is performed to produce a polyester, a compound selected from any one of a titanium compound, an aluminum compound, and a germanium compound is used as a catalyst of the polycondensation reaction, and the ionic liquid is added between the end of the transesterification or esterification reaction and the end of polycondensation reaction.

(20) The method of producing a polyester resin composition according to any one of (17) to (19), wherein the ionic liquid to be added is an ionic liquid that can dissolve the acid component monomer and/or oligomers.

(21) The method of producing a polyester resin composition according to any one of (17) to (20), wherein an alkali metal phosphate salt is added.

(22) The method of producing a polyester resin composition according to any one of (17) to (21), wherein solid phase polymerization is performed.

(23) The method of producing a polyester resin composition according to any one of (17) to (22), wherein a deactivation treatment is performed after solid phase polymerization.

(24) A polyester film composed of the polyester resin composition according to any one of (1) to (16).

(25) A polyester film comprising at least one polyester film layer composed of the polyester resin composition according to any one of (1) to (16).

(26) A polyester film comprising a polyester film layer composed of the polyester resin composition according to any one of (1) to (16) at least on a surface layer of one side.

A polyester resin composition having a small production rate of an acid component monomer and/or oligomers can be provided.

DETAILED DESCRIPTION

Our compositions and methods will be explained in detail below.

The polyester resin refers to a polyester resin obtained by the polycondensation of a dicarboxylic acid component and a diol component.

Examples of the dicarboxylic acid component include aliphatic dicarboxylic acids such as malonic acid, succinic acid, glutaric acid, adipic acid, suberic acid, sebacic acid, dodecanedioic acid, eicosanedioic acid, pimelic acid, azelaic acid, methylmalonic acid, and ethyl malonic acid, alicyclic dicarboxylic acids such as adamantane dicarboxylic acid, norbornene dicarboxylic acid, cyclohexane dicarboxylic acid, and decalin dicarboxylic acid, aromatic dicarboxylic acids such as terephthalic acid, isophthalic acid, phthalic acid, 1,4-naphthalene dicarboxylic acid, 1,5-naphthalene dicarboxylic acid, 2,6-naphthalene dicarboxylic acid, 1,8-naphthalene dicarboxylic acid, 4,4'-diphenyl dicarboxylic acid, 4,4'-diphenyl ether dicarboxylic acid, 5-sodium sulfoisophthalic acid, phenylindane dicarboxylic acid, anthracene dicarboxylic acid, phenanthrene dicarboxylic acid, and 9,9'-bis(4-carboxyphenyl)fluorene acid, and ester derivatives thereof. Among these, an aromatic dicarboxylic acid is preferably used from the viewpoints of oxidative decomposition resistance, thermal resistance, and hydrolysis resistance of the polyester resin composition as well as mechanical strength upon the production of a film from the composition. In particular, terephthalic acid is more preferred.

For the diol component, various diols can be used. Examples thereof include aliphatic diols such as ethylene glycol, 1,2-propanediol, 1,3-propanediol, butanediol, 2-methyl-1,3-propanediol, hexanediol, and neopentyl glycol. For alicyclic diols, saturated alicyclic primary diols such as cyclohexane dimethanol, cyclohexane diethanol, decahydronaphthalene dimethanol, decahydronaphthalene diethanol, norbornane dimethanol, norbornane diethanol, tricyclodecane dimethanol, tricyclodecane ethanol, tetracyclododecane dimethanol, tetracyclododecane diethanol, decalin dimethanol, and decalin diethanol, cyclic ether-containing saturated heterocyclic primary diols such as 2,6-dihydroxy-9-oxabicyclo[3,3,1]nonane, 3,9-bis(2-hydroxy-1,1-dimethyl ethyl)-2,4,8,10-tetraoxaspiro[5,5]undecane (spiroglycol), 5-methylol-5-ethyl-2-(1,1-dimethyl-2-hydroxyethyl)-1,3-dioxane, and isosorbide, other various alicyclic diols such as cyclohexanediol, bicyclohexyl-4,4'-diol, 2,2-bis(4-hydroxycyclohexylpropane), 2,2-bis(4-(2-hydroxyethoxy)cyclohexyl)propane, cyclopen-tanediol, 3-methyl-1,2-cyclopentadiol, 4-cyclopentene-1,3-diol, and adamandiol, and aromatic cyclic diols such as paraxylene glycol, bisphenol A, bisphenol S, styrene glycol, 9,9-bis(4-(2-hydroxyethoxy)phenyl)fluorene, and 9,9'-bis(4-hydroxyphenyl)fluorene can be exemplified. Other than diols, a multifunctional alcohol such as trimethylolpropane or pentaerythritol can be also used as long as the gelation does not occur.

Among these, a diol having a boiling point of 230° C. or less is preferred, and an aliphatic diol is preferred. Ethylene glycol is particularly preferred from the viewpoints of, for example, mechanical properties upon the production of a film from the composition such as extensibility and flexibility.

As long as the desired effect is not impaired, other dicarboxylic acid, hydroxy carboxylic acid derivative, or diol may be copolymerized. In the polyester resin composition, it is necessary that the production rate of the acid component monomer obtained by formula (I) and/or the production rate of the oligomers obtained by formula (II) is/are less than 0.70. In the formulas, the amount of production and the content of the acid component monomer and the oligomers are individually values obtained by measurements according to measurement methods (5) and (6) in Examples as explained later.

Production rate of acid component monomer=
(amount of produced acid component monomer)/(acid component monomer content)   (I)

Production rate of oligomers=(amount of produced oligomers)/(oligomer content)   (II).

The production rate of the acid component monomer and the production rate of the oligomers represent individually the ratio of each amount of the acid component monomer and the oligomers that emerge from the resin composition due to scattering, sublimation or the like (referred to as the amount of production) to each total amount of the acid component monomer and the oligomers contained in the polyester resin composition after a melting treatment (referred to as the content). The lower this value is, the more efficiently the production of the acid component monomer and/or oligomers can be suppressed. As a result, the deposition and sublimation during the forming process are less likely to occur, and thus the contamination during the process and the surface contamination can be reduced.

The value of the production rate of the acid component monomer and/or the production rate of the oligomers is more preferably less than 0.65, and further preferably less than 0.55.

The acid component monomer refers to a dicarboxylic acid component which forms a polyester resin, as shown specifically in the above examples.

The oligomer refers to a reactant resulted from the reaction of a carboxyl group of the dicarboxylic acid and a hydroxyl group of the diol, and does not include cyclic oligomers such as cyclic trimers. The oligomer has a degree of polymerization of 10 or less, and the terminal groups may be a carboxyl terminus or hydroxyl terminus.

In a typical polyester, PET, examples of oligomers include reactants of carboxylic acid of terephthalic acid and ethylene glycol, i.e., MHET (monohydroxyethyl terephthalate) and BHET (bishydroxyethyl terephthalate), and further include reaction products which are formed by the reaction of terminal groups and which have a degree of polymerization of 10 or less.

For the polyester resin composition, it is necessary that the surface roughness Ra of a capture plate is less than 0.150 µm, as measured when a sample of the polyester resin composition is melt at 300° C. for 60 minutes under a nitrogen atmosphere, quickly cooled and thermally treated at 220° C. for 8 hours to form scattered products which are then attached to the capture plate. For the measurement method of the surface roughness Ra and the production of the capture plate, a method described in the measurement method (9) explained later in the Examples is used.

Main components of the scattered products captured on the capture plate are, in PET, for example, an acid component monomer such as terephthalic acid and oligomers such as MHET and BHET. In other words, a small value of the surface roughness Ra of the capture plate indicates a small amount of scattering of the acid component monomer and/or oligomers during the heating. Therefore, the polyester resin composition that results in the surface roughness Ra value of less than 0.150 µm can reduce contamination during the process which is caused by scattering and sublimation of the acid component monomer and/or oligomers during the forming process. The Ra value of the capture plate is preferably 0.145 µm or less, more preferably 0.130 µm or less, and further preferably 0.110 µm or less.

In the polyester resin composition, both of the polyester resin compositions shown in (1) and (2) can be achieved by, specifically, producing a polyester resin composition that contains an ionic liquid that can dissolve the acid component monomer and/or oligomers of the polyester.

(1) A polyester resin composition, wherein the surface roughness Ra of a capture plate is less than 0.150 µm, as measured when a sample of the polyester resin composition is melt at 300° C. for 60 minutes under a nitrogen atmosphere, quickly cooled and thermally treated at 220° C. for 8 hours to form scattered products which are then attached to the capture plate.

(2) A polyester resin composition, wherein the production rate of an acid component monomer and/or the production rate of oligomers is/are less than 0.70, as defined by formulas (I) and (II):

Production rate of acid component monomer=
(amount of produced acid component monomer)/(acid component monomer content)      (I)

Production rate of oligomers=(amount of produced oligomers)/(oligomer content)      (II).

The ionic liquid refers to a molten salt, but in recent years, it refers to an ionic salt which liquefies at a temperature near room temperature (for example, Chemical Industry, 2004 VOL. 55 NO. 11). Because ionic liquids are liquids consisting of ions and do not contain any solvent, they exert little vapor pressure and have non-flammable characteristics. In addition, since ionic liquids have the characteristics of ionic compounds, in other words, high ionic electrical conductivity and high thermal resistance, the application of ionic liquids in various fields has been developed such as the use as a solvent in an organic synthetic reaction or electrolyte. Furthermore, the ionic liquids can be provided with various properties by changing the combination of the constituent cation and anion. Thus, they are compounds which are still studied considerably.

The ionic liquid refers to, among compounds consisting of ions, those in which the cation is organic. The anion may be either inorganic or organic. The melting point is not particularly limited, but the melting point of 150° C. or less is preferred because of easy handling in practice.

Examples of cations forming an ionic liquid include, but are not limited to, cations which have nitrogen as its ion center, cations having phosphorus as its ion center, cations having sulfur as its ion center, and cations having nitrogen and sulfur as its ion center.

Examples of cations which have nitrogen as its ion center include, but are not limited to, imidazolium cations, ammonium cations, pyridinium cations, quinolinium cations, pyrrolidinium cations, piperazinium cations, piperazinium cations, morpholinium cations, pyridazinium cations, pyrimidinium cations, pyrazinium cations, pyrazolium cations, thiazolium cations, oxazolium cations, triazolium cations, guanidium cations, and 4-aza-1-azonia-bicyclo-[2,2,2] octanium. These cations may have a substituent group represented by an alkyl group in an arbitrary position, and the number of substituent groups may be more than one.

Among these cations, cations mainly used today, i.e., imidazolium cations, ammonium cations, pyridinium cations, pyrrolidinium cations and piperazinium cations are listed as specific examples, but cations are not limited to these.

Specific examples of imidazolium cations include 1-methyl imidazolium, 1-ethyl imidazolium, 1-propyl imidazolium, 1-butyl imidazolium, 1-butyl-3-methyl imidazolium, 1-ethyl-3-methyl imidazolium, 1-allyl-3-methyl imidazolium, 1,3-diallyl imidazolium, 1-benzyl-3-methyl imidazolium, 1-methyl-3-octyl imidazolium, 1,2,3-trialkyl imidazolium such as 1-ethyl-2,3-dimethyl imidazolium, 1-butyl-2,3-dimethyl imidazolium and 1,2-dimethyl-3-propyl imidazolium, 1-cyanopropyl-3-methyl imidazolium, 1,3-biscyanomethyl imidazolium, 1,3-bis(3-cyanopropyl) imidazolium, 1-(2-hydroxyethyl)-3-methyl imidazolium, 1-methoxyethyl-3-methyl imidazolium, 1-[2-(2-methoxyethoxy)-ethyl]-3-methyl imidazolium, 1,3-diethoxy imidazolium, 1,3-dimethoxy imidazolium, 1,3-dihydroxy imidazolium, 1-methyl-3-(3,3,4,4,5,5,6,6,7,7,8,8,8-tridecafluorooctyl imidazolium, and 1-methyl-3-[(triethoxysilyl)propyl]imidazolium.

Specific examples of ammonium cations include tetramethyl ammonium, tetraethyl ammonium, tetrabutyl ammonium, tetrahexyl ammonium, trihexyltetradecyl ammonium, (2-hydroxyethyl)trimethyl ammonium, N,N-diethyl-N-(2-methoxyethyl)-N-methyl ammonium, tris(2-hydroxyethyl) methyl ammonium, trimethyl(1H,1H,2H,2H-heptadecafluorodecyl)ammonium, trimethyl-(4-vinylbenzyl)ammonium, tributyl-(4-vinylbenzyl)ammonium, 2-(methacryloyloxy) ethyltrimethyl ammonium, benzyldimethyl(octyl) ammonium, and N,N-dimethyl-N-(2-phenoxyethyl)-1-dodecyl ammonium.

Specific examples of pyridinium cations include 1-ethyl pyridinium, 1-butyl pyridinium, 1-(3-hydroxypropyl)pyridinium, 1-ethyl-3-methyl pyridinium, 1-butyl-3-methyl pyridinium, 1-butyl-4-methyl pyridinium, and 1-(3-cyanopropyl) pyridinium.

Specific examples of pyrrolidinium cations include 1-methyl-1propyl pyrrolidinium, 1-butyl-1-methyl pyrrolidinium, 1-(2-hydroxyethyl)-1-methyl pyrrolidinium, and 1-ethyl-1-methyl pyrrolidinium.

Specific examples of piperidinium cations include 1-methyl-1propyl piperidinium, 1-butyl-1-methyl piperidinium, 1-(2-hydroxyethyl)-1-methyl piperidinium, and 1-ethyl-1-methyl piperidinium.

Cations which have phosphorus as its ion center are generally called phosphonium cations, and specific examples thereof include tetrabutyl phosphonium, tetrahexyl phosphonium, trihexyltetradecyl phosphonium, triphenylmethyl phosphonium, (2-cyanoethyl)triethyl-phosphonium, (3-chloropropyl)trioctyl phosphonium, tributyl(4-vinylbenzyl) phosphonium, triisobutylmethyl phosphonium, triethylmethyl phosphonium, tributylmethyl phosphonium, tributylhexadecyl phosphonium, and 3-(triphenylphosphonio)propane-1-sulfonic acid.

Cations which have sulfur as its ion center are generally called sulfonium cations, and specific examples thereof include triethyl sulfonium, tributyl sulfonium, 1-ethyl tetrahydrothiophenium, and 1-butyl tetrahydrothiophenium.

Specific examples of anions include fluoride, chloride, bromide, iodide, dicyanamide, bis(fluorosulfonyl)amide, bis(trifluoromethyl sulfonyl)amide, bis(pentafluoroethyl sulfonyl)amide, bis(nonafluorobutyl sulfonyl)amide, tetrafluoroborate, tetrakis[3,5-bis(trifluoromethyl)phenyl]borate, methane sulfonate, butyl sulfonate, trifluoromethane sulfonate, tetrafluoroethane sulfonate, nonafluorobutane sulfonate, benzene sulfonate, p-toluene sulfonate, 2,4,6-trimethylbenzene sulfonate, styrene sulfonate, perfluorooctane sulfonate, heptadecafluorooctane sulfonate, 3-sulfopropyl methacrylate, 3-sulfopropyl acrylate, methyl sulfate, ethyl sulfate, octyl sulfate, diethylene glycol monomethyl ether sulfate, hydrogen sulfate, hexafluoro phosphate, tris(pentafluoroethyl) trifluoro phosphate, dihydrogen phosphate, dibutyl phosphate, diethyl phosphate, dimethyl phosphate, bis(2,4,4-trimethylpentyl) phosphinate, methyl phosphonate, methylmethyl phosphonate, formate, acetate, propionate, butyrate, trifluoro acetate, hydroxy acetate, perfluoro nonanoate, decanoate, mandelate, thiosalicylate, benzoate, salicylate, fluorohydrogenate, lactate, glycinate, alaninate, leucinate, valinate, trifluoromethanesulfonyl leucinate, trifluoromethanesulfonyl valinate, nitrate, perchlorate, phenoxide, thiocyanate, tris(trifluoromethanesulfonyl)methide, acesulfamate, saccharinate, pyrazolate, imidazolate, thiazolate, triazolate, tetrazolate, indazolate, benzothiazolate, hexafluoroastatinate, hexafluoroantimonate, thiocyanate, tetrachloroaluminate, tetrachloroferrate, carbonate, methyl carbonate, and carbamate.

In the polyester resin composition, the amount of scattering and the amount of production of the acid component monomer and/or oligomers of the polyester can be suppressed because the ionic liquid that can dissolve the acid component monomer and/or oligomers of the polyester. The ionic liquids that can dissolve the acid component monomer and/or oligomers include not only ionic liquids that can dissolve the acid component monomer and/or oligomers when used alone but also the combination of ionic liquids that can dissolve the acid component monomer and/or oligomers when two or more types are used in combination.

By using the ionic liquid that can dissolve the acid component monomer and/or oligomers, a state can be attained in which the acid component monomer and/or oligomers are dissolved in the polyester resin composition. As a result, even if the acid component monomer and/or oligomers are formed, the acid component monomer and/or oligomers are in a state of being dissolved, resulting in the decrease in the amount of scattering and the amount of production. Consequently, deposition and sublimation during the forming process are less likely to occur and, thus, the contamination during the process and the surface contamination can be reduced.

Whether the ionic liquid can dissolve the acid component monomer and/or oligomers of the polyester is determined as follows: a mixture of 100 parts by weight of the ionic liquid and 10 parts by weight of the acid component monomer or oligomers is formed, the ionic liquid is liquefied at 140° C., and the mixture is stirred for 15 minutes; then it is determined visually if a homogeneous solution is formed or not. When a homogeneous solution is formed, the ionic liquid is determined to be able to dissolve the acid component monomer and/or oligomers. In a heterogeneous solution, the ionic liquid is determined to be unable to dissolve the acid component monomer and/or oligomers.

The amount of ionic liquid that can dissolve the acid component monomer and/or oligomers of the polyester is preferably 0.01 wt % to 20 wt % based on the weight of the polyester resin. When the ionic liquid is in this range, the amount of produced acid component monomer and/or oligomers can be effectively suppressed. The lower limit is more preferably 0.05 wt % or more, and further preferably 0.1 wt % or more. The upper limit is more preferably 15 wt % or less, and further preferably 10 wt % or less.

Even when the ionic liquid content is more than 20 wt %, the effect of decreasing the amount of produced acid component monomer and/or oligomers is observed due to the dissolving action; however, the ionic liquid content of more than 20 wt % tends to result in a larger amount of COOH terminal groups in the resulting polyester resin composition, and thus more formation of the acid component monomer and/or oligomers. As a result, the amount of produced acid component monomer and/or oligomers also tends to increase, and the maximum effect of the ionic liquid may not be realized.

The ionic liquid in which the pKa of the conjugate acid of the anion is greater than −10 is preferably used. When the pKa of the conjugate acid of the anion in the ionic liquid is within this range, the interaction with the acid component monomer and/or oligomers can be enhanced, and the amount of scattering and the amount of production can be effectively suppressed. The pKa of the conjugate acid of the anion is explained in, for example, International Journal of Quantum Chemistry, Vol 90, 1396-1403 (2002) and Chem. Commun. 1906-1917 (2006). The pKa value of the conjugate acid of the anion is more preferably greater than −7, and further preferably greater than −4. However, even when the pKa of the conjugate acid is within this range, an anion with many fluorine substituent groups such as bis(trifluoromethanesulfonyl)imide or tetrafluoroborate is not preferred because, in this case, the acid component monomer and/or oligomers can be difficult to dissolve.

The molecular weight of the anion in the ionic liquid is preferably 270 or less. In this range, the ionic liquid and the acid component monomer and/or oligomers interact easily, and the amount of scattering and the amount of production of the acid component monomer and/or oligomers can be effectively suppressed. The lower limit is not particularly limited, but too small an anion molecular weight can result in less interaction with the acid component monomer and/or oligomers. Thus, the anion molecular weight is preferably 35 or more. In the present invention, the anion molecular weight refers to the MolcularWeight obtained using a Chem-BioDraw (produced by PerkinElmer).

An anion forming the ionic liquid is preferably either a halide ion or an organic acid-derived ion, and further preferably an organic acid-derived ion. This is because these anions are likely to interact with the acid component monomer and/or oligomers, and thus scattering and the production can be effectively suppressed. Among halide ions, chloride and bromide are more preferred. Among organic acid-derived ions, carboxylate ions and sulfonate ions are more preferred. Preferable specific examples of carboxylate ions include, but are not limited to, acetate, benzoate, and salicylate. Specific examples of sulfonate ions include, but are not limited to, methane sulfonate and p-toluene sulfonate.

The amount of the COOH terminal groups is preferably 35 eq/t or less. A small initial amount of the COOH terminal groups results in a smaller unit of the acid component monomer which can occur during the decomposition of the polyester. Thus, with the amount of COOH terminal groups in this range, formation of the acid component monomer and/or oligomers can be suppressed and, consequently, the amount of production can be also reduced. The amount is more preferably 32 eq/t or less, and further preferably 30 eq/t or less.

The amount of produced acid component monomer and/or oligomers is quantified by the analysis of the components produced upon the melting treatment at 290° C. for 20 minutes under a stream of nitrogen gas. The amount of produced acid component monomer and/or oligomers does not include the acid component monomer and/or oligomers which are formed during the melting treatment and remain contained in the polyester resin composition. In other words, the amount of production refers to the amount produced outside the resin composition along with vaporization and sublimation during the melting treatment.

In a typical polyester, PET, the amount of production of the acid component monomer, i.e., terephthalic acid is preferably 500 ppm or less, more preferably 450 ppm or less, and further preferably 400 ppm or less. For the amount of produced oligomers, in PET as an example, the total amount of MHET (monohydroxyethyl terephthalate) and BHET (bishydroxyethyl terephthalate) is preferably 400 ppm or less, more preferably 350 ppm or less, and further preferably 300 ppm or less. When the amount of produced acid component monomer and the amount of produced oligomers are individually in the above-explained ranges, the reduction in the contamination during the process and the surface contamination, which are due to the acid component monomer and/or oligomers and become problematic during the forming process, can be realized.

The amount of increase in a cyclic trimer ΔC3 upon melting at 300° C. for 20 minutes is preferably less than 0.30 wt %. The amount of increase in the cyclic trimer is a value obtained by measurements according to the measurement methods (10) and (11) in the Examples explained later.

When a formed product such as a film or fiber is heated or exposed to a solvent or the like, the cyclic trimer deposits on the surface of the formed product, which causes a problem of surface defect or contamination. The ΔC3 amount of less than 0.3 wt % can reduce the cyclic trimer amount in the formed product. The ΔC3 amount is further preferably less than 0.1 wt %. Deactivation treatment of a polymerization catalyst is performed after solid phase polymerization to deactivate the polymerization catalyst, and the increase of the cyclic trimer during melt forming can be further suppressed.

The polyester resin composition has a cyclic trimer content of preferably less than 0.6 wt %, and further preferably less than 0.45 wt %. The above range can prevent the surface defect and contamination of the formed product. The cyclic trimer content is reduced by performing solid phase polymerization. The cyclic trimer is reduced by solid phase polymerization, and the amount of increase in the cyclic trimer during the melt forming is reduced by the deactivation treatment after the solid phase polymerization. Thus, the cyclic trimer content in the formed product after the melt forming can be effectively reduced.

The gelation ratio after a 6-hour melting treatment at 300° C. under a nitrogen atmosphere with an oxygen concentration of 1% is preferably 5% or less. The gelation ratio is more preferably 3% or less, and further preferably 1% or less. This index is an index for thermal stability of polymers. In a forming process such as film production or fiber spinning in which a polyester resin composition is melted, it is common to carry out a purge with inert gas such as nitrogen to prevent thermal degradation of polymers during the melting. This method causes the contamination of a trace of oxygen through a shaft seal part or the like of a extruder for film production or a extruder for fiber spinning. The measurement conditions of the gelation ratio in the present invention are determined in consideration of the forming process with nitrogen purging in the above process. A smaller gelation ratio means a better thermal resistance. The gelation ratio within the above range can provide a polyester resin composition suitable for a film or a fiber that requires high thermal stability.

The polyester resin composition can promote its thermal resistance and decrease the gelation ratio by containing a reducible compound such as manganese, copper or iodine. Among manganese, copper and iodine, manganese and copper are preferable because they are unlikely to volatilize outside the system upon the polymerization.

Examples of manganese compounds include, but are not limited to, inorganic compounds such as manganese dioxide, manganese chloride, manganese bromide, manganese iodine, manganese borate, manganese sulfate, manganese nitrate, manganese phosphate, various manganic acid salts, various permanganic acid salts and manganese carbonate, carboxylic acid salts such as manganese acetate, manganese formate, manganese oxalate and manganese naphthenate, and various complexes such as manganese acetylacetonate and manganese phthalocyanine. Among these, manganese acetate is particularly preferred because of its easy accessibility. The content is, in terms of the gel suppression effect, preferably not less than 0.2 mol/t and not more than 5.0 mol/t based on the polyester resin composition. A small amount of addition does not bring out sufficient gel suppression effect while a large amount is likely to cause the decomposition upon the melting, thereby decreasing thermal resistance.

For the copper compound, various copper compounds such as copper oxide, copper halide, copper carboxylate and alkylated copper complexes can be used. Specific examples thereof include, but are not limited to, copper(I) oxide, copper(II) oxide, lithium dimethylcuprate, lithium dibutylcuprate, copper(I) acetate, copper(II) acetate, copper benzoate, copper carbonate, copper chloride, copper bromide, and copper iodide. In particular, copper acetate or copper halide is preferred. The content is, in terms of the gel suppression effect, preferably not less than 0.1 mol/t and not more than 10.0 mol/t. A small amount of addition does not bring out sufficient gel suppression effect while a large amount of addition deteriorates the color tone.

The polyester resin composition preferably satisfies the following formula (III):

$$(\Delta COOH/COOH) < 3.5 \tag{III}$$

($\Delta$COOH: the amount of increase in COOH terminal groups upon a 4-hour treatment at 155° C. and 100% RH
COOH: the amount of COOH terminal groups before the above-mentioned treatment).

This range can provide a polyester resin composition that shows less degradation caused by hydrolysis when used for a long period. The value of ($\Delta$COOH/COOH) is more preferably 3.0 or less, and further preferably 2.5 or less.

The polyester resin composition preferably contains an alkali metal phosphate salt in order to provide excellent hydrolysis resistance. The content of the alkali metal phosphate salt is not particularly limited, but since too small a content does not exhibit the effect, the content of 0.1 mol/t or more as an alkali metal element is more preferred. Although the upper limit is not particularly limited, the content of 7.0 mol/t or less is more preferred because the color tone or the like can deteriorate when the content of the alkali metal element is too large.

Examples of the alkali metal phosphate salt include, sodium dihydrogen phosphate, disodium hydrogen phosphate, trisodium phosphate, potassium dihydrogen phosphate, dipotassium hydrogen phosphate, tripotassium phosphate, lithium dihydrogen phosphate, and dilithium hydrogen phosphate.

For good hydrolysis resistance, the M/P represented by formula (IV) is preferably 1.5 or less. The lower limit is not particularly limited, but the M/P of 0.3 or more is preferred:

$$M/P = (M_2 + M_1/2)/P \tag{IV}$$

wherein $M_2$ represents the content of a divalent metal element (mol/t), $M_1$ represents the content of a monovalent metal element (mol/t), and P represents the content of phosphorus element (mol/t). Sb, Ti, Ge, Al, and Cu are not included in the calculation.

The polyester resin composition preferably has a total light transmittance of more than 85%. The total light transmittance is a value obtained by a measurement according to the measurement method (17) in the Examples explained later.

The total light transmittance within the above range can provide a formed product which is excellent in transparency and therefore suitable for an optical film. The total light transmittance is more preferably more than 88%, and further preferably more than 90%.

The polyester resin composition can achieve high transparency within the above range by using as a polycondensation catalyst a compound selected from a titanium compound, an aluminum compound and a germanium compound.

The method of producing the polyester resin composition will be explained below.

The polyester resin composition can be produced by, for example, methods (1) and (2), but the method is not limited to these. For an apparatus and a technical process of producing a polyester, any apparatus and process which are generally used may be used.
(1) method of obtaining a polyester resin composition containing an ionic liquid by adding the ionic liquid at any time between before the beginning of transesterification or esterification reaction and the end of polycondensation reaction.
(2) method of obtaining a polyester resin composition containing an ionic liquid by kneading a polyester resin obtained according to a known method such as polycondensation with the ionic liquid in a kneader.

Between these methods, to decrease the amount of COOH terminal groups in the resulting resin composition and obtain efficiently a polyester resin composition that produces a small amount of the acid component monomer and/or oligomers, the production method (1) in which an ionic liquid is added at an arbitrary stage before the polycondensation reaction ends is preferred. The arbitrary stage is preferably between the end of the transesterification or esterification reaction and the end of the polymerization reaction. The addition performed during the above period results in good dispersibility, and no additional step such as a kneading step is necessary.

A specific example of the production of a typical polyester, PET, in the method (1) is explained below, but the method is not limited to this example.

To an esterification reactor charged with bishydroxyethyl terephthalate melted at 255° C., a slurry of terephthalic acid and ethylene glycol (1.15 times the amount of terephthalic acid (mol)) is added gradually via a progressive cavity pump to proceed the esterification reaction. The temperature inside the reaction system is controlled at 245 to 255° C., and the esterification reaction is considered to be over when the reaction ratio reaches 95%.

To the resulting esterification reactant of 255° C. are added a polycondensation catalyst, a phosphorus compound, and an ionic liquid. In doing this operation, the temperature inside the system is preferably kept at 240 to 255° C. so that the esterification product will not solidify.

After that, while the temperature inside the polymerization apparatus is gradually raised to 290° C., the pressure inside the polymerization apparatus is gradually reduced from a normal pressure to 133 Pa or less, and ethylene glycol is distilled. At this point, when a further reduced amount of COOH terminal groups in the polyester composition is desired, the polymerization temperature may be set at a lower temperature. The reaction is finished when a predetermined stirring torque is reached, and the reaction system is set at a normal pressure with nitrogen gas. The molten polymer is discharged into cold water in a strand shape and cut. Thus, a pellet-shaped polyester resin composition can be obtained.

For the catalyst used in the production of the polyester composition, a known transesterification catalyst, a polycondensation catalyst, or a co-catalyst can be used. Examples of the polymerization catalyst include, but are not limited to, antimony compounds, germanium compounds, titanium compounds, and aluminum compounds. Among these, the use of a titanium compound, an aluminum compound, or a germanium compound results in a good transparency of the resin, and thus a polyester resin composition suitable for the optical film application or the like can be obtained. Examples of antimony compounds include, but are not limited to, diantimony trioxide and antimony acetate. Examples of titanium compounds include, but are not limited to, alkoxy titanium compounds such as tetra-n-butoxytitanium, tetra-I-propoxytitanium, tetrakis(2-ethylhexyloxy) titanium, and tetrastearyl oxytitanium. Examples of aluminum compounds include, but are not limited to, aluminum carboxylate compounds such as aluminum formate, aluminum acetate, aluminum propionate, aluminum oxalate, aluminum benzoate, and aluminum terephthalate, inorganic aluminum salt compounds such as aluminum chloride, aluminum hydroxide, aluminum nitrate, aluminum carbonate, and aluminum phosphate, and organoaluminum compounds such as aluminum methoxide, aluminum ethoxide, aluminum propoxide, and aluminum butoxide. Examples of germanium compounds include, but are not limited to, germanium dioxide.

Examples of transesterification catalysts and co-catalysts include, but are not limited to, organomanganese compounds, organomagnesium compound, organocalcium compounds, organocobalt compounds, and organolithium compounds.

A phosphorus compound may be added to provide the resin composition with thermal stability. The phosphorus compound herein does not include a phosphorus-containing ionic liquid such as a phosphonium-based ionic liquid. When a phosphorus element is contained, the thermal stability of the resin composition can be promoted and, therefore, the increase in the amount of COOH terminal groups after polymerization can be inhibited. Consequently, the amount of produced acid component monomer and/or oligomers can be decreased.

The phosphorus compound to be used is not particularly limited, and examples thereof include phosphite-containing compounds, phosphate-containing compounds, phosphonic acid-containing compounds, phosphinic acid-containing compounds, phosphine oxide-containing compounds, phosphonous acid-containing compounds, phosphinous acid-containing compounds, and phosphine-containing compounds. Specific examples thereof include phosphoric acid, trimethyl phosphonoacetate, triethyl phosphonoacetate, dimethyl phenylphosphonate, trimethyl phosphate, triethyl phosphate, triphenyl phosphate, sodium dihydrogen phosphate, disodium hydrogen phosphate, trisodium phosphate, potassium dihydrogen phosphate, dipotassium hydrogen phosphate, tripotassium phosphate, lithium dihydrogen phosphate, dilithium hydrogen phosphate, trilithium phosphate, calcium phosphate and magnesium phosphate. Among these, an alkali metal phosphate salt is preferably added for the improvement of hydrolysis resistance. When phosphoric acid and an alkali metal phosphate salt are mixed and added, hydrolysis resistance can be further promoted. Thus, the combination of phosphoric acid and an alkali metal phosphate salt is more preferred.

The amount of the phosphorus compound to be added is not particularly limited, but the lower limit of the amount of addition is, as the phosphorus element content, 5 ppm or more based on the polyester resin composition. The lower limit is more preferably 10 ppm or more, and further preferably 20 ppm or more. The upper limit of the amount of addition is, as the phosphorus element content, preferably 600 ppm or less. This range allows for good thermal stability of the resin composition without a delay of polymerization.

Solid phase polymerization is preferably performed. By performing solid phase polymerization, the cyclic trimer and linear oligomers in the polyester resin composition can be decreased. The conditions for solid phase polymerization are not particularly limited, but the solid phase polymerization is preferably carried out from at a temperature 30° C. lower than the melting point of the polyester resin composition to at a temperature 60° C. lower than the melting point of the polyester resin composition. The degree of vacuum is preferably 0.3 Torr or less. Solid phase polymerization time is preferably not shorter than 3 hours and not longer than 20 hours from the viewpoints of the manufacturing time cycle, although it is appropriately set depending on the melt viscosity of target.

Furthermore, the deactivation treatment is preferably carried out for the reduction in the amount of increase in the cyclic trimer. The deactivation treatment is a step to deactivate the polycondensation catalyst and can reduce the amount of increase in the cyclic trimer during the melt forming. The deactivation treatment can be carried out in various solutions of water, a phosphorus compound or an ammonia compound, e.g., Examples of phosphorus compounds include, but are not limited to, phosphoric acid esters such as trimethyl phosphate, triethyl phosphate, tributyl phosphate, triphenyl phosphate, dimethyl phosphate, diphenyl phosphate, methyl phosphate, and ethyl phosphate, and aqueous solutions or solutions of a phosphorus compound such as phosphoric acid or polyphosphoric acid. Examples of ammonia compounds include triethylamine, tetramethylammonium hydroxide and tetra-n-butylammonium hydroxide. The treatment temperature is preferably not lower than 20° C. and not higher than 120° C., more preferably not lower than 40° C. and not higher than 100° C., and further preferably not lower than 50° C. and not higher than 100° C. The treatment time is preferably not shorter than 30 minutes and not longer than 24 hours, and more preferably not shorter than 1 hour and not longer than 12 hours.

As long as the desired effect is not impaired, the polyester resin composition may be, as required, blended with a terminal blocking agent, an antioxidant, an ultraviolet absorber, a flame retardant, a fluorescent whitening agent, a flatting agent, a plasticizer or an defoaming agent or other additive(s).

The polyester resin composition is a resin composition that produces a small amount of an acid component monomer and/or oligomers during the forming process, and can be used suitably for various applications including high-grade films such as optical films and releasable films, fibers and formed products.

EXAMPLES

Our compositions and methods will be explained in more detail by way of Examples. The physical property values in Examples were measured by the following methods.

(1) The Intrinsic Viscosity of the Polyester Resin Composition (IV)

An o-chlorophenol solvent was used for the measurement at 25° C.

(2) The Amount of COOH Terminal Groups of the Polyester Resin Composition

The measurement was performed according to the method of Maulice. (Literature M. J. Maulice, F. Huizinga, Anal. Chem. Acta, 22, 363 (1960))

(3) The Solubility of the Acid Component Monomer of the Polyester

The mixture of 100 parts by weight of an ionic liquid and 10 parts by weight of terephthalic acid was heated at 140° C. to liquefy the ionic liquid completely. The mixture was then stirred at 140° C. for 15 minutes. When the solution was visually confirmed to be homogeneous, the solubility was evaluated as ○. When the solution was not homogeneous, it was evaluated as x.

(4) The Solubility of the Oligomers of the Polyester

The mixture of 100 parts by weight of an ionic liquid and 10 parts by weight of MHET (monohydroxyethyl terephthalate) was heated at 140° C. to liquefy the ionic liquid completely. The mixture was then stirred at 140° C. for 15 minutes. When the solution was visually confirmed to be homogeneous, the solubility was evaluated as ○. When the solution was not homogeneous, it was evaluated as x.

In the same way, 10 parts by weight of BHET (bishydroxyethyl terephthalate) was used instead of MHET to check the solubility of BHET.

(5) The Acid Component Monomer/Oligomer Contents in the Polyester Resin Composition after the Melting Treatment The polyester resin composition was frozen and crushed, and then vacuum-dried at 150° C. for 3 hours. The dried sample was weighed out in an amount of 0.1 g, and a melting treatment was carried out in a sealed tube at 290° C. for 20 minutes under a nitrogen atmosphere. The sample in the sealed tube after the melting treatment was dissolved in 2 mL of a mixture solution of HFIP/chloroform=1/1. After 3 mL of chloroform was added, 40 mL of methanol was gradually added. The mixture was then filtered through a paper filter, and the resulting solution was concentrated and evaporated to dryness. To the resulting residue was added 0.5 mL of DMF, and the residue was dissolved and dispersed. Ethanol was then added and the volume was adjusted to 5 mL. The solution was then filtered through a PTFE membrane filter with a pore size of 0.45 and the filtrate was used as a sample solution. The resulting sample solution was analyzed by LC/UV to measure the acid component monomer and oligomer contents in the polyester resin composition after the melting treatment. In the Tables, the linear oligomer content represents the total value of the acid component monomer content and oligomer content.

(6) The Amount of Production of the Acid Component Monomer/Oligomers of the Polyester The polyester resin composition was frozen and crushed, and then vacuum-dried at 150° C. for 3 hours. Then, 2.0 g of the dried sample was placed in an impinger, and subjected to a melting treatment at 290° C. for 20 minutes under a stream of nitrogen (50 mL/min). After the produced components were trapped in methanol, the solution was concentrated and the volume was adjusted to 5 mL with methanol. Then, 2 mL of the resulting methanol solution was collected and evaporated to dryness with nitrogen purging, and dissolved in 0.2 mL of methanol again to obtain a sample solution. The resulting sample solution was analyzed by LC/UV to measure the amount of produced acid component monomer and the amount of produced oligomers. In Tables, the amount of produced linear oligomers represents the total value of the amount of produced acid component monomer and the amount of produced oligomers.

(7) The Production Rate of the Acid Component Monomer/Oligomers of the Polyester Using formulas (I) and (II), the production rate of the acid component monomer of the polyester and the production rate of the oligomers of the polyester were individually calculated. The acid component monomer content and the oligomer content in formulas (I) and (II) represent individually the content in the polyester resin composition after the melting treatment as measured in method (5). The amount of produced acid component monomer and the amount of produced oligomers represent individually the amount of produced acid component monomer and the amount of produced oligomers as measured in method (6).

$$\text{Production rate of acid component monomer} = (\text{amount of produced acid component monomer})/(\text{acid component monomer content}) \quad (I)$$

$$\text{Production rate of oligomers} = (\text{amount of produced oligomers})/(\text{oligomer content}) \quad (II).$$

(8) The Production Rate of the Linear Oligomers

Using the following formula, the production rate of the linear oligomers was calculated. The linear oligomer content in the following formula represents the linear oligomer content after the melting treatment as measured in method (5). The amount of produced linear oligomers represents the amount of produced linear oligomers as measured in method (6).

$$\text{Production rate of linear oligomers} = (\text{amount of produced linear oligomers})/(\text{linear oligomer content}).$$

(9) The Measurement of the Surface Roughness Ra

An 8-g chip was weighed out in a test tube having a diameter of 16.5 mm×a length of 165 mm, and left still in a vacuum drying machine. The pressure was reduced to 10 Torr or less, and then the temperature in the drying machine was raised to 150° C. When the temperature reached 150° C., the chip was vacuum-dried for 3 hours, and then the temperature in the drying machine was raised to 180° C. When the temperature reached 180° C., the chip was vacuum-dried for 7.5 hours. After that, with a nitrogen atmosphere inside the test tube, the test tube was dipped in an oil bath of 300° C. The resin was subjected to the 60-minute thermal treatment, taken out with a PTFE tube with a inner diameter of 10 mm, and cooled quickly in iced water to obtain a resin column. The resulting resin column was cut into a 5 mm×5 mm square and used as a sample. The sample was vacuum-dried for 3 hours at room temperature and used as a measurement sample.

Then, 3 g of the resulting measurement sample was evenly spread in a round ashtray for ash content measurement (produced by AlphaPurchase Co., Ltd. catalog number: 5-4072-03, diameter 63 mm×height 18 mm, model number: CW-3), and covered with a transparent glass plate of 100 mm×100 mm (produced by AlphaPurchase Co., Ltd, catalog number: 313196) with the center of the glass plate on the center of ashtray. The surface of the glass plate had been washed under the conditions explained later.

In a ducted fume hood, the sample-containing ashtray with the glass plate put thereon was placed on a hot plate heated at 220° C., and heated for 8 hours. Scattered products were trapped on the transparent glass plate. A laser microscope produced by Keyence Corporation (model number: VKX-200) was used to measure the surface roughness at 5 sites, following the conditions explained later. The surface roughness Ra was calculated from the average value obtained from the 5 sites, using formula (V).

Glass Plate Washing Conditions

Both sides of the glass plate were washed with water. A detergent was applied on the both sides, and the glass plate was washed along with a gentle rub with a finger. After the plate was washed with water to remove the detergent, the plate was washed with ethanol on the both sides and dried in a hot-air drying machine at 50° C. for 10 minutes. After that, both sides were wiped with a gauze (produced by Hakujuji Co., Ltd., medical gauze, type I, width 30 cm×length 10 m) dampened with ethanol, and the plate was further dried for 5 minutes in the hot-air drying machine at 50° C. The surface roughness Ra of the washed glass plate was 0.010 μm.

Image Observation•Treatment•Measurement Conditions
  Laser control knob: the scale mark was set at 6
  Camera brightness: 70
  Imaging mode: easy mode (full automatic)
  Objective lens: ×150
  Object to be observed in the image: 5 sites in total including a central site of the circle area of attached products and arbitrary 4 sites within a circle with a radius of 5 mm from the center.
  Noise elimination: normal
  Tilt correction: surface tilt correction (automatic)

Surface roughness measurement conditions: JIS B0601: 2001 standards were selected $$Ra = (Ra_1 + Ra_2 + Ra_3 + Ra_4 + Ra_5)/5 \quad (V)$$

In the formula, $Ra_1$ to $Ra_5$ are individually the Ra value measured in each site.

(10) Cyclic Trimer Content (C3 Content)

Ortho-chlorophenol was used as a solvent, and measurement was carried out with a liquid chromatograph.
Apparatus: LC-10ADvp produced by SHIMADZU CORPORATION
Column: YMC-Pack ODS-A 150×4.6 mm S-5 μm
Column temperature: 40° C.
Flow rate: 1.3 ml/min
Detector: 240 nm
Eluent: liquid A pure water 25%, liquid B methanol 75%.

(11) The Amount of Increase in the Cyclic Trimer (ΔC3)

Eight grams of the polyester resin composition was vacuum-dried at 150° C. for 8 hours. The dried polyester resin composition was subjected to a melting treatment at 300° C. for 20 minutes under a nitrogen atmosphere. The content of the cyclic trimer of this polymer after the melting treatment was measured as in the above (10). The values before and after the melting treatment were compared, and the amount of increase in the cyclic trimer (ΔC3) was thus calculated.

(12) The Quantification of the Alkali Metal Element and the Copper Element in the Polyester Resin Composition The quantification was performed by the atomic absorption analysis method (Hitachi, Ltd.: polarized zeeman atomic absorption spectrophotometer 180-80. Flame: acetylene-air).

(13) The Quantification of the Alkaline Earth Metal Element, Magnesium Element, Manganese Element, Antimony Element, and Phosphorus Element in the Polyester Resin Composition The measurement was carried out using an X-ray fluorescence analyzer produced by Rigaku Corporation (model number: 3270).

(14) The Gelation Ratio

The polyester resin composition was crushed using a freezer mill (produced by Sprex CertiPerp), and 0.5 g of the polyester resin composition was weighed out in a stainless beaker. The polyester resin composition was then vacuum-dried at 50° C. for 2 hours, using a vacuum drying machine, and subjected to a heating treatment at 300° C. for 6 hours under a stream of nitrogen gas with an oxygen concentration of 1% (flow rate 0.5 L/min). The resultant was then dissolved in 20 ml of o-chlorophenol at 160° C. for 1 hour and allowed to cool. This solution was filtered through a glass filter (produced by SIBATA SCIENTIFIC TECHNOLOGY LTD., 3GP40). The glass filter was washed with dichloromethane. The glass filter was dried at 130° C. for 2 hours. From the increment in the weight of the filter (gelated product) between before and after the filtration, the weight ratio to the polyester weight (0.5 g) was obtained, and used as the gelation ratio (%).

(15) The Heat-Moisture Treatment Evaluation of the Polyester Resin Composition (ΔCOOH)

The polyester resin composition was subjected a heat-moisture treatment at 155° C. for 4 hours in the saturated water vapor. The amounts of COOH terminal groups before and after the treatment were measured to calculate the amount of increase in COOH terminal groups (ΔCOOH).

The following apparatus for heating treatment was used.
PRESSER COOKER 306SIII (produced by HIRAYAMA MANUFACTURING CORPORATION)

(16) The Production of a Pressed Sheet

The polyester resin composition was vacuum-dried at 150° C. for 8 hours, and a pressed sheet with a thickness of 100 μm was produced, using a pressing apparatus heated at 290° C.

(17) The Total Light Transmittance

According to JIS-K-7361-1, the pressed sheet produced in the above (16) was measured for the total light transmittance, using a single beam hazemeter.

Ionic liquid names

For the ionic liquids used in each Example and Comparison Example, the names, the solubility of the acid component monomer/oligomers, the pKa of the conjugate acid of the anion, and the anion molecular weight are shown in Table 1.

TABLE 1

| | Names | Solubility of Acid Component Monomer/ Oligomer | pKa of Conjugate Acid of Anion | Anion Molecular Weight |
|---|---|---|---|---|
| A | 1-butyl-3-methylimidazolium acetate | o | 4.8 | 59.0 |
| B | 1-butyl-3-methylimidazolium chloride | o | −3.0 | 35.5 |
| C | tetrabutyl ammonium bromide | o | −6.0 | 79.9 |
| D | tetrabutyl phosphonium bromide | o | −6.0 | 79.9 |
| E | Trihexyl tetradecyl phosphonium chloride | o | −3.0 | 35.5 |
| F | tetrabutyl ammonium methane sulfonate | o | −2.0 | 95.1 |
| G | tetrahexyl ammonium bromide | o | −6.0 | 79.9 |
| H | 1-ethyl-3-methylimidazolium acetate | o | 4.8 | 59.0 |
| I | 1-butyl-4-methylpyridinium bromide | o | −6.0 | 79.9 |
| J | 1-ethyl-3-methylimidazolium bis(trifluoromethane sulfonyl)imide | x | −4.0 | 280.2 |
| K | octyldimethyl-2-hydroxyethyl ammonium bis(trifluoromethyl sulfonyl)imide | x | −4.0 | 280.2 |
| L | N,N-diethyl-N-(2-methoxyethyl)ammonium tetrafluoroborate | x | −0.4 | 86.8 |
| M | N,N-dimethyl-N-(2-methoxyethyl)ammonium bis(trifluoromethane sulfonyl)imide | x | −4.0 | 280.2 |
| N | 1-ethyl-3-methylimidazolium trifluoromethane sulfonate | o | −13.0 | 149.1 |
| O | tetrabutyl phosphonium methane sulfonate | o | −2.0 | 95.1 |
| P | tetrabutyl ammonium benzoate | o | 4.2 | 121.1 |
| Q | tetrabutyl ammonium salicylate | o | 3.0 | 137.1 |

Example 1

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and 0.02 parts by weight of trimethyl phosphate was added. The mixture was stirred for 10 minutes. Next, 1.0 part by weight of the ionic liquid A was added, and the mixture was stirred for 5 minutes. After that, 0.009 parts by weight of diantimony trioxide was added.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.65 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained. Properties of the resulting polyester resin composition are shown in Table 2.

Since the polyester resin composition obtained in Example 1 contained an ionic liquid capable of dissolving the acid component monomer and the oligomers of the polyester, the amounts of produced acid component monomer and produced oligomers were small. The surface roughness Ra of the capture plate was also small.

Examples 2 to 9

Polyester resin compositions were obtained in the same way as in Example 1 except that the ionic liquid to be added was changed as in Table 2. Properties of the resulting polyester resin compositions are shown in Table 2.

Since the polyester resin composition obtained in Examples 2 to 9 contained an ionic liquid capable of dissolving the acid component monomer and the oligomers of the polyester, the amounts of produced acid component monomer and produced oligomers were small. The surface roughness Ra of the capture plate was also small.

Reference Example 1

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and 0.02 parts by weight of trimethyl phosphate was added. The mixture was stirred for 10 minutes. After that, 0.009 parts by weight of diantimony trioxide was added.

While the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.70 was reached, and the reaction system was set at a normal pressure with nitrogen gas. The molten polymer was discharged from the bottom of the polymerization apparatus into cold water in a strand shape and cut. Thus, a pellet-shaped polyester resin was obtained.

Example 10

The polyester resin obtained in Reference Example 1 was vacuum-dried at 160° C. for 5 hours, and this polyester resin and the ionic liquid A were fed to a twin screw extruder equipped with a vent in a blend ratio of 100 parts by weight to 1.0 part by weight respectively, and melt-extruded at a temperature of 280 degrees. The discharged strand-shaped polymer was cooled in water and cut with a pelletizer to obtain a pellet-shaped polyester resin composition. Properties of the resulting polyester resin composition are shown in Table 2.

Since the polyester resin composition obtained in Example 10 contained an ionic liquid capable of dissolving the acid component monomer and the oligomers of the polyester, the amounts of produced acid component monomer and produced oligomers were small; however, since the amount of the COOH terminal groups increased due to the melting and kneading, the amounts of production were larger than in Example 1. The surface roughness Ra of the capture plate was also small, but compared to Example 1, it was large.

TABLE 2

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Ionic Liquid | Type | A | B | C | D | E | F | G | H | I | A |
| | Content (wt %) | 1.0 | 1.0 | 1.0 | 1.0 | 1.0 | 1.0 | 1.0 | 1.0 | 1.0 | 1.0 |
| Polymer Properties | IV | 0.65 | 0.65 | 0.65 | 0.65 | 0.65 | 0.65 | 0.65 | 0.65 | 0.65 | 0.65 |
| | COOH (eq/t) | 29.5 | 28.5 | 29.1 | 29.3 | 29.4 | 29.5 | 28.8 | 29.9 | 29.9 | 47.7 |
| Acid Component Monomer/ Oligomer Contents After Melting Treatment | TPA (ppm) | 723 | 719 | 732 | 714 | 732 | 731 | 722 | 730 | 725 | 1085 |
| | MHET (ppm) | 380 | 383 | 389 | 384 | 388 | 377 | 383 | 384 | 382 | 605 |
| | BHET (ppm) | 141 | 140 | 142 | 140 | 139 | 142 | 143 | 142 | 140 | 195 |

TABLE 2-continued

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Acid Component Monomer/ Oligomer Production Amounts | TPA (ppm) | 252 | 255 | 253 | 257 | 254 | 256 | 254 | 251 | 255 | 408 |
| | MHET (ppm) | 158 | 161 | 161 | 162 | 162 | 161 | 161 | 159 | 160 | 245 |
| | BHET (ppm) | 60 | 61 | 62 | 63 | 63 | 63 | 62 | 60 | 60 | 82 |
| Production rate of Acid Component Monomer | | 0.35 | 0.35 | 0.35 | 0.36 | 0.35 | 0.35 | 0.35 | 0.34 | 0.35 | 0.38 |
| Production Rate of Oligomers | | 0.42 | 0.42 | 0.42 | 0.43 | 0.43 | 0.43 | 0.42 | 0.42 | 0.42 | 0.41 |
| Surface Roughness Ra (μm) | | 0.081 | 0.096 | 0.099 | 0.098 | 0.094 | 0.043 | 0.098 | 0.080 | 0.097 | 0.112 |
| Hydrolysis Resistance (ΔCOOH) | | 90.1 | 85.5 | 87.3 | 87.9 | 88.2 | 580.0 | 86.4 | 89.7 | 89.8 | 162.2 |
| ΔCOOH/COOH | | 3.1 | 3.0 | 3.0 | 3.0 | 3.0 | 19.7 | 3.0 | 3.0 | 3.0 | 3.4 |
| C3 Content (wt %) | | 1.05 | 1.10 | 1.08 | 1.10 | 1.05 | 1.05 | 1.10 | 1.08 | 1.10 | 1.12 |
| ΔC3 Amount (wt %) | | — | — | — | — | — | — | — | — | — | — |
| Gelation Ratio (%) | | 5.5 | 5.7 | 6.1 | 6.0 | 6.2 | 8.0 | 5.7 | 6.1 | 6.0 | 8.9 |
| Total Light Transmittance (%) | | 85 | 85 | 85 | 85 | 85 | 85 | 85 | 85 | 85 | 85 |

TPA: terephthalic acid
MHET: monohydroxyethyl terephthalate
BHET: bishydroxyethyl terephthalate
Ionic Liquid A: 1-butyl-3-methylimidazolium acetate
B: 1-butyl-3-methylimidazolium chloride
C: tetrabutyl ammonium bromide
D: tetrabutyl phosphonium bromide
E: trihexyl tetradecyl phosphonium chloride
F: tetrabutyl ammonium methane sulfonate
G: tetrahexyl ammonium bromide
H: 1-ethyl-3-methylimidazolium acetate
I: 1-butyl-4-methylpyridinium bromide Comparative Example 1

A polyester resin composition was obtained in the same way as in Example 1 except that the ionic liquid was not added. Properties of the resulting polyester resin composition are shown in Table 3.

Since the polyester resin composition obtained in Comparative Example 1 did not contain an ionic liquid, both the amounts of produced acid component monomer and produced oligomers increased. The value of the surface roughness Ra of the capture plate was more than 0.150 μm, resulting in a large amount of scattered products.

Comparative Example 2

A polyester resin composition was obtained in the same way as in Example 1 except that the ionic liquid to be added was changed to an ionic liquid J which could not dissolve the acid component monomer and the oligomers of the polyester. Properties of the resulting polyester resin composition are shown in Table 3.

Since the polyester resin composition obtained in Comparative Example 2 did not contain an ionic liquid capable of dissolving the acid component monomer and/or oligomers, both the amounts of produced acid component monomer and produced oligomers increased. The value of the surface roughness Ra of the capture plate was more than 0.150 μm, resulting in a large amount of scattered products.

Comparative Example 3

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and 0.02 parts by weight of trimethyl phosphate was added. The mixture was stirred for 10 minutes. After that, 0.009 parts by weight of diantimony trioxide was added.

While the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.50 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained.

The resulting polyester resin composition was dried at 150° C. for 4 hours and crystallized, and then subjected to solid phase polymerization for 8 hours at a chip temperature of 220° C. and at a degree of vacuum of 0.3 Torr or less to obtain a polyester resin composition with an intrinsic viscosity of 0.75. Properties of the resulting polyester resin composition are shown in Table 3.

Although the solid phase polymerization was carried out, since the polyester resin composition obtained in Comparative Example 3 did not contain an ionic liquid capable of dissolving the acid component monomer and/or oligomers, both the amounts of produced acid component monomer and produced oligomers increased. The value of the surface roughness Ra of the capture plate was more than 0.150 μm, resulting in a large amount of scattered products.

Comparative Example 4

The polyester resin obtained in Reference Example 1 was vacuum-dried at 160° C. for 5 hours, and this polyester resin and the ionic liquid K were fed to a twin screw extruder equipped with a vent in a blend ratio of 100 parts by weight to 1.0 part by weight respectively, and melt-extruded at a temperature of 280 degrees. The discharged strand-shaped polymer was cooled in water and cut with a pelletizer to obtain a pellet-shaped polyester resin composition. Properties of the resulting polyester resin composition are shown in Table 3.

For the polyester resin composition obtained in Comparative Example 4, the ionic liquid capable of dissolving neither the acid component monomer nor the oligomers was used and, moreover, the amount of COOH terminal groups in the polymer obtained by melting and kneading increased. Thus, the amounts of produced acid component monomer and produced oligomers were still larger than in Comparative Example 1. The value of the surface roughness Ra of the capture plate was more than 0.150 μm, resulting in a large amount of scattered products.

Comparative Examples 5 to 8

Polyester resin compositions were obtained in the same way as in Comparative Example 4 except that the ionic liquid to be blended was changed as in Table 3. Properties of the resulting polyester resin compositions are shown in Table 3.

For the polyester resin compositions obtained in Comparative Examples 5 to 8, the ionic liquid capable of dissolving neither the acid component monomer nor the oligomers was used and, moreover, the amount of COOH terminal groups in the polymer obtained by melting and kneading increased. Thus, the amounts of produced acid component monomer and produced oligomers were still larger than in Comparative Example 1. The value of the surface roughness Ra of the capture plate was more than 0.150 μm, resulting in a large amount of scattered products.

TABLE 3

| | | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Ionic Liquid | type | — | J | — | K | J | L | M | N |
| | Content (wt %) | — | 1.0 | — | 1.0 | 1.0 | 1.0 | 1.0 | 1.0 |
| Polymer Properties | IV | 0.65 | 0.65 | 0.75 | 0.65 | 0.65 | 0.65 | 0.65 | 0.65 |
| | COOH (eq/t) | 31.0 | 30.9 | 22.5 | 50.2 | 49.8 | 50.2 | 48.9 | 51.4 |
| Acid Component Monomer/ Oligomer Contents After Melting Treatment | TPA (ppm) | 743 | 738 | 658 | 1076 | 1086 | 1093 | 1102 | 1104 |
| | MHET (ppm) | 380 | 387 | 352 | 612 | 614 | 615 | 621 | 632 |
| | BHET (ppm) | 143 | 145 | 126 | 192 | 198 | 200 | 196 | 201 |
| Monomer/ Oligomer Production Amounts | TPA (ppm) | 570 | 560 | 520 | 800 | 812 | 815 | 818 | 817 |
| | MHET (ppm) | 340 | 335 | 308 | 512 | 518 | 522 | 523 | 529 |
| | BHET (ppm) | 100 | 100 | 95 | 145 | 148 | 151 | 152 | 154 |
| Production rate of Acid Component Monomer | | 0.77 | 0.76 | 0.79 | 0.74 | 0.75 | 0.75 | 0.74 | 0.74 |
| Production Rate of Oligomers | | 0.84 | 0.82 | 0.84 | 0.82 | 0.82 | 0.83 | 0.83 | 0.82 |
| Surface Roughness Ra (μm) | | 0.162 | 0.161 | 0.160 | 0.164 | 0.164 | 0.163 | 0.164 | 0.162 |
| Hydrolysis Resistance (ΔCOOH) | | 108.5 | 309.1 | 65.3 | 527.1 | 517.9 | 225.9 | 508.6 | 600 or more |
| ΔCOOH/COOH | | 3.5 | 10.0 | 2.9 | 10.5 | 10.4 | 4.5 | 10.4 | Incalculable |
| C3 Content (wt %) | | 1.10 | 1.10 | 0.45 | 1.11 | 1.12 | 1.12 | 1.11 | 1.10 |
| ΔC3 (wt %) | | — | — | — | — | — | — | — | — |
| Gelation Ratio (%) | | 8.6 | 9.2 | 8.5 | 9.4 | 9.2 | 8.2 | 9.3 | 10.0 |
| Total Light Transmittance (%) | | 85 | 85 | 85 | 85 | 85 | 85 | 85 | 85 |

TPA: terephthalic acid
MHET: monohydroxyethyl terephthalate
BHET: bishydroxyethyl terephthalate
Ionic Liquid J: 1-ethyl-3-methylimidazolium bis(trifluoromethane sulfonyl)imide
K: octyl dimethyl-2-hydroxyethyl ammonium bis(trifluoromethyl sulfonyl)imide
L: N,N-diethyl-N-(2-methoxyethyl)ammonium tetrafluoroborate
M: N,N-dimethyl-N-(2-methoxyethyl)ammonium bis(trifluoromethane sulfonyl)imide
N: 1-ethyl-3-methylimidazolium trifluoromethanesulfonate Examples 11 to 18

Polyester resin compositions were obtained in the same way as in Example 1 except that the ionic liquid A was used as the ionic liquid to be added and that its content was as shown in Table 4. Properties of the resulting polyester resin compositions are shown in Table 4.

Since the polyester resin compositions obtained in Examples 11 to 18 contained an ionic liquid capable of dissolving the acid component monomer and the oligomers of the polyester, the amounts of produced acid component monomer and produced oligomers were small. The surface roughness Ra of the capture plate was also small.

TABLE 4

|  |  | Example 11 | Example 12 | Example 13 | Example 14 | Example 15 | Example 16 | Example 17 | Example 18 |
|---|---|---|---|---|---|---|---|---|---|
| Ionic Liquid | type | A | A | A | A | A | A | A | A |
|  | Content (wt %) | 0.01 | 0.05 | 0.1 | 3.0 | 5.0 | 10 | 20 | 25 |
| Polymer Properties | IV | 0.65 | 0.65 | 0.65 | 0.65 | 0.65 | 0.65 | 0.65 | 0.65 |
|  | COOH (eq/t) | 30.2 | 29.9 | 29.8 | 28.7 | 29.4 | 31.9 | 34.6 | 40.5 |
| Acid Component Monomer/Oligomer Contents After Melting Treatment | TPA (ppm) | 742 | 734 | 730 | 725 | 734 | 738 | 749 | 772 |
|  | MHET (ppm) | 398 | 392 | 388 | 382 | 382 | 396 | 399 | 412 |
|  | BHET (ppm) | 148 | 145 | 146 | 140 | 143 | 146 | 148 | 153 |
| Monomer/Oligomer Production Amounts | TPA (ppm) | 487 | 420 | 348 | 252 | 261 | 298 | 340 | 380 |
|  | MHET (ppm) | 285 | 245 | 198 | 161 | 163 | 180 | 196 | 220 |
|  | BHET (ppm) | 85 | 80 | 75 | 61 | 63 | 74 | 75 | 79 |
| Production rate of Acid Component Monomer |  | 0.66 | 0.57 | 0.48 | 0.35 | 0.36 | 0.40 | 0.45 | 0.49 |
| Production Rate of Oligomers |  | 0.68 | 0.61 | 0.51 | 0.43 | 0.43 | 0.47 | 0.50 | 0.53 |
| Surface Roughness Ra (μm) |  | 0.142 | 0.128 | 0.110 | 0.078 | 0.076 | 0.080 | 0.083 | 0.088 |
| Hydrolysis Resistance (ΔCOOH) |  | 93.6 | 89.7 | 89.4 | 86.1 | 88.2 | 98.9 | 103.8 | 133.7 |
| ΔCOOH/COOH |  | 3.1 | 3.0 | 3.0 | 3.0 | 3.0 | 3.1 | 3.0 | 3.3 |
| C3 Content (wt %) |  | 1.05 | 1.10 | 1.08 | 1.10 | 1.07 | 1.09 | 1.08 | 1.10 |
| ΔC3 (wt %) |  | — | — | — | — | — | — | — | — |
| Gelation Ratio (%) |  | 5.8 | 5.6 | 5.5 | 5.5 | 5.6 | 5.7 | 5.7 | 6.0 |
| Total Light Transmittance (%) |  | 85 | 85 | 85 | 85 | 85 | 85 | 85 | 85 |

TPA: terephthalic acid
MHET: monohydroxyethyl terephthalate
BHET: bishydroxyethyl terephthalate
Ionic Liquid A: 1-butyl-3-methylimidazolium acetate Examples 19 to 23

Polyester resin compositions were obtained in the same way as in Example 1 except that the ionic liquid to be added and its content were changed as in Table 5. Properties of the resulting polyester resin compositions are shown in Table 5.

Since the polyester resin compositions obtained in Examples 19 to 23 contained an ionic liquid capable of dissolving the acid component monomer and the oligomers of the polyester, the amounts of produced acid component monomer and produced oligomers were small. The surface roughness Ra of the capture plate was also small.

TABLE 5

|  |  | Example 19 | Example 20 | Example 21 | Example 22 | Example 23 |
|---|---|---|---|---|---|---|
| Ionic Liquid | type | O | P | F | P | F |
|  | Content (wt %) | 1.0 | 1.0 | 0.1 | 0.1 | 0.05 |
| Polymer Properties | IV | 0.65 | 0.65 | 0.65 | 0.65 | 0.65 |
|  | COOH (eq/t) | 29.6 | 28.8 | 29.1 | 29.4 | 29.9 |
| Acid Component Monomer/Oligomer Contents After Melting Treatment | TPA (ppm) | 730 | 724 | 729 | 731 | 737 |
|  | MHET (ppm) | 378 | 380 | 385 | 387 | 393 |
|  | BHET (ppm) | 141 | 140 | 146 | 145 | 146 |
| Acid Component Monomer/Oligomer Production Amounts | TPA (ppm) | 257 | 256 | 346 | 350 | 418 |
|  | MHET (ppm) | 162 | 160 | 197 | 198 | 244 |
|  | BHET (ppm) | 63 | 62 | 75 | 75 | 79 |

TABLE 5-continued

|  | Example 19 | Example 20 | Example 21 | Example 22 | Example 23 |
|---|---|---|---|---|---|
| Production rate of Acid Component Monomere | 0.35 | 0.35 | 0.47 | 0.48 | 0.57 |
| Production Rate of Oligomers | 0.43 | 0.43 | 0.51 | 0.51 | 0.60 |
| Surface Roughness Ra (μm) | 0.053 | 0.064 | 0.065 | 0.088 | 0.102 |
| Hydrolysis Resistance (ΔCOOH) | 556.5 | 83.5 | 509.3 | 88.2 | 373.8 |
| ΔCOOH/COOH | 18.8 | 2.9 | 17.5 | 3.0 | 12.5 |
| C3 Content (wt %) | 1.09 | 1.09 | 1.08 | 1.09 | 1.08 |
| ΔC3 (wt %) | — | — | — | — | — |
| Gelation Ratio (%) | 8.0 | 7.6 | 7.7 | 7.1 | 7.0 |
| Total Light Transmittance (%) | 85 | 85 | 85 | 85 | 85 |

TPA: terephthalic acid
MHET: monohydroxyethyl terephthalate
BHET: bishydroxyethyl terephthalate
Ionic Liquid F: tetrabutyl ammonium methane sulfonate
O: tetrabutyl phosphonium methane sulfonate
P: tetrabutyl ammonium benzoate Example 24

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and then 0.03 parts by weight of diantimony trioxide, 0.02 parts by weight of trimethyl phosphate, and 0.03 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a pellet-shaped polymer was obtained.

The resulting pellet-shaped polymer was dried at 160° C. for 6 hours and crystallized, and subjected to solid phase polymerization at 220° C. for 8 hours and at a degree of vacuum of 0.3 Torr to obtain a polyester resin composition. Properties of the resulting polyester resin composition are shown in Table 6.

The resulting polyester resin composition obtained in Example 24 exhibited small content and amount of increase of the cyclic trimer as well as a small production rate of the linear oligomers, and thus had suitable physical properties for optical films and releasable films.

Examples 25 to 32

Polyester resin compositions were obtained in the same way as in Example 24 except that the ionic liquid to be added was changed as in Table 6. Properties of the resulting polyester resin compositions are shown in Table 6.

The resulting polyester resin compositions obtained in Examples 25 to 32 exhibited small content and amount of increase of the cyclic trimer as well as a small production rate of the linear oligomers, and thus had suitable physical properties for optical films and releasable films.

TABLE 6

|  |  | Example 24 | Example 25 | Example 26 | Example 27 | Example 28 | Example 29 | Example 30 | Example 31 | Example 32 |
|---|---|---|---|---|---|---|---|---|---|---|
| Ionic Liquid | Type | F | A | B | C | D | E | G | H | I |
|  | Amount of Addition (wt %) | 0.1 | 0.1 | 0.1 | 0.1 | 0.1 | 0.1 | 0.1 | 0.1 | 0.1 |
| IV |  | 0.80 | 0.81 | 0.80 | 0.80 | 0.80 | 0.81 | 0.80 | 0.80 | 0.81 |
| COOH (eq/t) |  | 15.2 | 15.0 | 14.8 | 15.5 | 15.2 | 15.3 | 15.2 | 15.0 | 15.2 |
| C3 Content (wt %) |  | 0.44 | 0.43 | 0.44 | 0.44 | 0.42 | 0.41 | 0.40 | 0.44 | 0.42 |
| ΔC3 Amount (wt %) |  | 0.25 | 0.24 | 0.25 | 0.25 | 0.24 | 0.26 | 0.25 | 0.28 | 0.29 |
| Linear Oligomer Content (ppm) |  | 1420 | 1380 | 1380 | 1320 | 1440 | 1480 | 1520 | 1380 | 1390 |
| Linear Oligomer Production Amount (ppm) |  | 850 | 865 | 890 | 880 | 870 | 920 | 980 | 830 | 850 |
| Production Rate of Linear Oligomers |  | 0.60 | 0.63 | 0.64 | 0.67 | 0.60 | 0.62 | 0.64 | 0.60 | 0.61 |
| Surface Roughness Ra (μm) |  | 0.066 | 0.109 | 0.120 | 0.121 | 0.122 | 0.119 | 0.122 | 0.110 | 0.118 |

TABLE 6-continued

|  | Example 24 | Example 25 | Example 26 | Example 27 | Example 28 | Example 29 | Example 30 | Example 31 | Example 32 |
|---|---|---|---|---|---|---|---|---|---|
| Hydrolysis Resistance (ΔCOOH) | 182.4 | 39.0 | 38.5 | 40.3 | 39.5 | 39.8 | 39.5 | 39.0 | 39.5 |
| ΔCOOH/COOH | 12.0 | 2.6 | 2.6 | 2.6 | 2.6 | 2.6 | 2.6 | 2.6 | 2.6 |
| Gelation Ratio (%) | 12.0 | 11.2 | 11.0 | 11.1 | 11.0 | 11.2 | 11.3 | 11.4 | 11.2 |
| Total Light Transmittance (%) | 84 | 83 | 84 | 84 | 84 | 84 | 84 | 84 | 84 |

Ionic Liquid A: 1-butyl-3-methylimidazolium acetate
B: 1-butyl-3-methylimidazolium chloride
C: tetrabutyl ammonium bromide
D: tetrabutyl phosphonium bromide
E: trihexyl tetradecyl phosphonium chloride
F: tetrabutyl ammonium methane sulfonate
G: tetrahexyl ammonium bromide
H: 1-ethyl-3-methylimidazolium acetate
I: 1-butyl-4-methylpyridinium bromide

Example 33

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and then 0.03 parts by weight of diantimony trioxide, 0.02 parts by weight of trimethyl phosphate, and 0.03 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a pellet-shaped polymer was obtained.

The resulting pellet-shaped polymer was dried at 160° C. for 6 hours and crystallized, and subjected to solid phase polymerization at 220° C. for 8 hours and at a degree of vacuum of 0.3 Torr. After that, the resulting polymer was subjected to a deactivation treatment at 100° C. for 5 hours in contact with water, and thus a polyester resin composition was obtained.

Properties of the resulting polyester resin composition are shown in Table 7.

The resulting polyester resin composition obtained in Example 33 exhibited small content and amount of increase of the cyclic trimer as well as a small production rate of the linear oligomers, and thus had suitable physical properties for optical films and releasable films.

Examples 34 to 41

Polyester resin compositions were obtained in the same way as in Example 33 except that the ionic liquid added was changed as in Table 7. Properties of the resulting polyester resin compositions are shown in Table 7.

The resulting polyester resin compositions obtained in Examples 34 to 41 exhibited small content and amount of increase of the cyclic trimer as well as a small production rate of the linear oligomers, and thus had suitable physical properties for optical films and releasable films.

TABLE 7

|  |  | Example 33 | Example 34 | Example 35 | Example 36 | Example 37 | Example 38 | Example 39 | Example 40 | Example 41 |
|---|---|---|---|---|---|---|---|---|---|---|
| Ionic Liquid | Type | F | A | B | C | D | E | G | H | I |
|  | Amount of Addition (wt %) | 0.1 | 0.1 | 0.1 | 0.1 | 0.1 | 0.1 | 0.1 | 0.1 | 0.1 |
|  | IV | 0.80 | 0.81 | 0.80 | 0.80 | 0.80 | 0.81 | 0.80 | 0.80 | 0.81 |
|  | COOH (eq/t) | 15.5 | 15.1 | 15.2 | 15.2 | 15.1 | 15.4 | 15.0 | 15.2 | 15.2 |
|  | C3 Content (wt %) | 0.42 | 0.44 | 0.44 | 0.42 | 0.40 | 0.40 | 0.41 | 0.42 | 0.41 |
|  | ΔC3 Amount (wt %) | 0.08 | 0.08 | 0.09 | 0.08 | 0.07 | 0.08 | 0.09 | 0.08 | 0.08 |
|  | Linear Oligomer Content (ppm) | 1380 | 1450 | 1430 | 1330 | 1450 | 1320 | 1390 | 1350 | 1450 |
|  | Linear Oligomer Production Amount (ppm) | 680 | 720 | 700 | 690 | 710 | 690 | 720 | 730 | 750 |
|  | Production Rate of Linear Oligomers | 0.49 | 0.50 | 0.49 | 0.52 | 0.49 | 0.52 | 0.52 | 0.54 | 0.52 |
|  | Surface Roughness Ra (μm) | 0.065 | 0.109 | 0.119 | 0.120 | 0.121 | 0.119 | 0.121 | 0.108 | 0.118 |

TABLE 7-continued

|  | Example 33 | Example 34 | Example 35 | Example 36 | Example 37 | Example 38 | Example 39 | Example 40 | Example 41 |
|---|---|---|---|---|---|---|---|---|---|
| Hydrolysis Resistance (ΔCOOH) | 182.4 | 39.0 | 38.5 | 40.3 | 39.5 | 39.8 | 39.5 | 39.0 | 39.5 |
| ΔCOOH/COOH | 11.8 | 2.6 | 2.5 | 2.7 | 2.6 | 2.6 | 2.6 | 2.6 | 2.6 |
| Gelation Ratio (%) | 11.9 | 11.1 | 10.9 | 11.0 | 10.9 | 11.1 | 11.2 | 11.3 | 11.1 |
| Total Light Transmittance (%) | 84 | 83 | 84 | 84 | 84 | 84 | 84 | 84 | 84 |

Ionic Liquid A: 1-butyl-3-methylimidazolium acetate
B: 1-butyl-3-methylimidazolium chloride
C: tetrabutyl ammonium bromide
D: tetrabutyl phosphonium bromide
E: trihexyl tetradecyl phosphonium chloride
F: tetrabutyl ammonium methane sulfonate
G: tetrahexyl ammonium bromide
H: 1-ethyl-3-methylimidazolium acetate
I: 1-butyl-4-methylpyridinium bromide Comparative Example 9

A polyester resin composition was obtained in the same way as in Example 33 except that an ionic liquid was not added. Properties of the resulting polyester resin composition are shown in Table 8.

Although the polyester resin composition obtained in Comparative Example 9 exhibited a sufficiently reduced content and amount of increase of the cyclic trimer, the linear oligomers could not be dissolved in the polymer because the composition did not contain an ionic liquid, resulting in an increase in the amount of produced linear oligomers.

Comparative Examples 10 to 13

Polyester resin compositions were obtained in the same way as in Example 33 except that the ionic liquid to be added was changed as in Table 8. Properties of the resulting polyester resin compositions are shown in Table 8.

The polyester resin compositions obtained in Comparative Examples 10 to 13 had a sufficiently reduced content and amount of increase of the cyclic trimer. However, the linear oligomers could not be dissolved in the polymer because, despite the addition of the ionic liquid, the linear oligomers had a low solubility in the ionic liquid, resulting in an increase in the amount of produced linear oligomers.

Example 42

A polyester resin composition was obtained in the same way as in Example 33 except that the solid phase polymerization was not carried out. Properties of the resulting polyester resin composition are shown in Table 8.

Since the resulting polyester resin composition contained an ionic liquid capable of dissolving the linear oligomers, the amount of produced linear oligomers was small.

TABLE 8

|  |  | Comparative Example 9 | Comparative Example 10 | Comparative Example 11 | Comparative Example 12 | Comparative Example 13 | Example 42 |
|---|---|---|---|---|---|---|---|
| Ionic Liquid | Type | — | J | K | L | M | F |
|  | Amount of Addition (wt %) | — | 0.1 | 0.1 | 0.1 | 0.1 | 0.1 |
| IV |  | 0.80 | 0.81 | 0.80 | 0.80 | 0.81 | 0.50 |
| COOH (eq/t) |  | 15.0 | 15.2 | 15.0 | 15.3 | 15.2 | 20.5 |
| C3 Content (wt %) |  | 0.42 | 0.41 | 0.44 | 0.42 | 0.40 | 1.10 |
| ΔC3 Amount (wt %) |  | 0.09 | 0.10 | 0.08 | 0.09 | 0.09 | — |
| Linear Oligomer Content (ppm) |  | 1390 | 1440 | 1380 | 1400 | 1420 | 1520 |
| Linear Oligomer Production Amount (ppm) |  | 1250 | 1320 | 1240 | 1190 | 1230 | 850 |
| Production Rate of Linear Oligomers |  | 0.90 | 0.92 | 0.90 | 0.85 | 0.87 | 0.56 |
| Surface Roughness Ra (μm) |  | 0.160 | 0.165 | 0.163 | 0.163 | 0.164 | 0.062 |
| Hydrolysis Resistance (ΔCOOH) |  | 39.0 | 120.1 | 118.5 | 120.9 | 54.7 | 369.0 |
| ΔCOOH/COOH |  | 2.6 | 7.9 | 7.9 | 7.9 | 3.6 | 18.0 |
| Gelation Ratio (%) |  | 12.8 | 13.2 | 12.9 | 13.2 | 13.1 | 11.0 |
| Total Light Transmittance (%) |  | 84 | 83 | 84 | 84 | 84 | 84 |

Ionic Liquid
F: tetrabutyl ammonium methane sulfonate
J: 1-ethyl-3-methylimidazolium bis(trifluoromethane sulfonyl)imide
K: octyldimethyl-2-hydroxyethyl ammonium bis(trifluoromethyl sulfonyl)imide
L: N,N-diethyl-N-(2-methoxyethyl)ammonium tetrafluoroborate
M: N,N-dimethyl-N-(2-methoxyethyl)ammonium bis(trifluoromethane sulfonyl)imide

Examples 43 to 49

Polyester resin compositions were obtained in the same way as in Example 33 except that the amount of the ionic liquid to be added was changed as in Table 9. Properties of the resulting polyester resin compositions are shown in Table 9.

The polyester resin compositions obtained in Examples 43 and 44 exhibited a small content and amount of increase of the cyclic trimer as well as a small production rate of the linear oligomers, and thus had suitable physical properties for optical films or releasable films. However, due to a small amount of the ionic liquid added, compared to Example 33, the production rate of the linear oligomers tended to increase.

The resulting polyester resin compositions obtained in Examples 45 to 47 exhibited small content and amount of increase of the cyclic trimer as well as a small production rate of the linear oligomers, and thus had suitable physical properties for optical films and releasable films.

The polyester resin compositions obtained in Examples 48 and 49 exhibited a small content and amount of increase of the cyclic trimer as well as a small production rate of the linear oligomers, and thus had suitable physical properties for optical films or releasable films. However, due to a large amount of the ionic liquid added, the deterioration in color tone and the increase in the amount of COOH terminal groups were observed.

Example 50

A polyester resin composition was obtained in the same way as in Example 33 except that the solid phase polymerization time was changed to 5 hours. Properties of the resulting polyester resin composition are shown in Table 9.

The polyester resin composition obtained in Example 50 exhibited a small content and amount of increase of the cyclic trimer as well as a small production rate of the linear oligomers, and thus had suitable physical properties for optical films or releasable films. However, due to the short solid phase polymerization time compared to Example 33, the cyclic trimer content tended to increase.

Example 51

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and 0.007 parts by weight of tetra-n-butoxytitanium, 0.007 parts by weight of trimethyl phosphate, and 0.01 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a polyester resin composition was obtained.

Properties of the resulting polyester resin composition are shown in Table 10.

The resulting polyester resin composition obtained in Example 51 exhibited a small production rate of the linear oligomers and further a sufficiently high total light transmittance, and thus had suitable physical properties for optical films and releasable films.

Examples 52 to 59

Polyester resin compositions were obtained in the same way as in Example 51 except that the ionic liquid to be added was changed as in Table 10. Properties of the resulting polyester resin compositions are shown in Table 10.

The resulting polyester resin compositions obtained in Examples 52 to 59 exhibited a small production rate of the

TABLE 9

|  |  | Example 43 | Example 44 | Example 45 | Example 46 | Example 47 | Example 48 | Example 49 | Example 50 |
|---|---|---|---|---|---|---|---|---|---|
| Ionic Liquid | Type | F | F | F | F | F | F | F | F |
|  | Amount of Addition (wt %) | 0.01 | 0.05 | 1 | 5 | 10 | 20 | 30 | 0.1 |
| IV |  | 0.80 | 0.81 | 0.81 | 0.80 | 0.80 | 0.81 | 0.80 | 0.70 |
| COOH (eq/t) |  | 15.1 | 15.0 | 15.5 | 15.8 | 16.5 | 19.8 | 22.8 | 17.2 |
| C3 Content (wt %) |  | 0.44 | 0.42 | 0.44 | 0.40 | 0.42 | 0.41 | 0.42 | 0.49 |
| ΔC3 Amount (wt %) |  | 0.08 | 0.08 | 0.09 | 0.08 | 0.09 | 0.09 | 0.10 | 0.10 |
| Linear Oligomer Content (ppm) |  | 1450 | 1380 | 1390 | 1420 | 1400 | 1520 | 1560 | 1420 |
| Linear Oligomer Production Amount (ppm) |  | 980 | 820 | 650 | 690 | 750 | 850 | 980 | 700 |
| Production Rate of Linear Oligomers |  | 0.68 | 0.59 | 0.47 | 0.49 | 0.54 | 0.56 | 0.63 | 0.49 |
| Surface Roughness Ra (μm) |  | 0.123 | 0.102 | 0.044 | 0.046 | 0.051 | 0.056 | 0.065 | 0.046 |
| Hydrolysis Resistance ΔCOOH |  | 90.6 | 150.0 | 204.6 | 221.2 | 231.0 | 283.1 | 330.6 | 227.0 |
| ΔCOOH/COOH |  | 6.0 | 10.0 | 13.2 | 14.0 | 14.0 | 14.3 | 14.5 | 13.2 |
| Gelation Ratio (%) |  | 12.0 | 11.4 | 11.6 | 11.8 | 11.6 | 11.9 | 11.5 | 11.2 |
| Total Light Transmittance (%) |  | 84 | 84 | 84 | 84 | 84 | 84 | 84 | 84 |

Ionic Liquid F: tetrabutyl ammonium methane sulfonate linear oligomers and further a sufficiently high total light transmittance, and thus had suitable physical properties for optical films and releasable films.

Example 60

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and then 0.02 parts by weight of germanium dioxide, 0.01 parts by weight of trimethyl phosphate, and 0.01 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a polyester resin composition was obtained.

Properties of the resulting polyester resin composition are shown in Table 10.

The resulting polyester resin composition obtained in Example 60 exhibited a small production rate of the linear oligomers and further a sufficiently high total light transmittance, and thus had suitable physical properties for optical films and releasable films.

Example 61

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and 0.015 parts by weight of aluminum hydroxide, 0.01 parts by weight of trimethyl phosphate, and 0.01 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature of the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained.

Properties of the resulting polyester resin composition are shown in Table 10.

The resulting polyester resin composition obtained in Example 61 exhibited a small production rate of the linear oligomers and further a sufficiently high total light transmittance, and thus had suitable physical properties for optical films and releasable films.

TABLE 10

|  |  | Example 51 | Example 52 | Example 53 | Example 54 | Example 55 | Example 56 |
|---|---|---|---|---|---|---|---|
| Ionic Liquid | Type | F | A | B | C | D | E |
|  | Amount of Addition (wt %) | 0.1 | 0.1 | 0.1 | 0.1 | 0.1 | 0.1 |
| Polymerization Catalyst |  | Ti | Ti | Ti | Ti | Ti | Ti |
| Intrinsic Viscosity (IV) |  | 0.55 | 0.56 | 0.54 | 0.55 | 0.55 | 0.54 |
| Amount of COOH Terminal Groups (eq/t) |  | 25.2 | 24.8 | 25.8 | 25.5 | 25.3 | 25.3 |
| C3 Content (wt %) |  | 1.05 | 1.10 | 1.08 | 1.10 | 1.05 | 1.05 |
| ΔC3 (wt %) |  | — | — | — | — | — | — |
| Linear Oligomer Content (ppm) |  | 1420 | 1380 | 1420 | 1400 | 1380 | 1370 |
| Linear Oligomer Production Amount (ppm) |  | 920 | 920 | 920 | 940 | 930 | 950 |
| Production Rate of Linear Oligomers |  | 0.65 | 0.67 | 0.65 | 0.67 | 0.67 | 0.69 |
| Total Light Transmittance (%) |  | 91 | 90 | 89 | 89 | 90 | 90 |
| Surface Roughness Ra (μm) |  | 0.067 | 0.110 | 0.120 | 0.122 | 0.122 | 0.120 |
| Hydrolysis Resistance (ΔCOOH) |  | 453.6 | 76.9 | 80.0 | 79.1 | 78.4 | 78.4 |
| ΔCOOH/COOH |  | 18.0 | 3.1 | 3.1 | 3.1 | 3.1 | 3.1 |
| Gelation Ratio (%) |  | 12.2 | 11.2 | 11.1 | 11.1 | 11.0 | 11.2 |

TABLE 10-continued

|  |  | Example 57 | Example 58 | Example 59 | Example 60 | Example 61 |
|---|---|---|---|---|---|---|
| Ionic Liquid | Type | G | H | I | F | F |
|  | Amount of Addition (wt %) | 0.1 | 0.1 | 0.1 | 0.1 | 0.1 |
| Polymerization Catalyst | | Ti | Ti | Ti | Ge | Al |
| Intrinsic Viscosity (IV) | | 0.55 | 0.56 | 0.55 | 0.54 | 0.55 |
| Amount of COOH Terminal Groups (eq/t) | | 25.5 | 25.1 | 24.9 | 23.8 | 25.1 |
| C3 Content (wt %) | | 1.10 | 1.05 | 1.10 | 1.02 | 1.10 |
| ΔC3 (wt %) | | — | — | — | — | — |
| Linear Oligomer Content (ppm) | | 1440 | 1400 | 1390 | 1380 | 1390 |
| Linear Oligomer Production Amount (ppm) | | 930 | 960 | 920 | 920 | 940 |
| Production Rate of Linear Oligomers | | 0.65 | 0.69 | 0.66 | 0.67 | 0.68 |
| Total Light Transmittance (%) | | 91 | 90 | 90 | 93 | 91 |
| Surface Roughness Ra (μm) | | 0.122 | 0.110 | 0.119 | 0.066 | 0.065 |
| Hydrolysis Resistance (ΔCOOH) | | 79.1 | 77.8 | 77.2 | 428.4 | 449.3 |
| ΔCOOH/COOH | | 3.1 | 3.1 | 3.1 | 18.0 | 17.9 |
| Gelation Ratio (%) | | 11.3 | 11.2 | 11.2 | 12.0 | 12.0 |

Ionic Liquid
A: 1-butyl-3-methylimidazolium acetate
B: 1-butyl-3-methylimidazolium chloride
C: tetrabutyl ammonium bromide
D: tetrabutyl phosphonium bromide
E: trihexyl tetradecyl phosphonium chloride
F: tetrabutyl ammonium methane sulfonate
G: tetrahexyl ammonium bromide
H: 1-ethyl-3-methylimidazolium acetate
I: 1-butyl-4-methylpyridinium bromide Example 62

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and 0.007 parts by weight of tetra-n-butoxytitanium, 0.007 parts by weight of trimethyl phosphate, and 0.01 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a pellet-shaped polymer was obtained.

The resulting pellet-shaped polymer was dried at 160° C. for 6 hours and crystallized, and subjected to solid phase polymerization at 220° C. for 8 hours and at a degree of vacuum of 0.3 Torr to obtain a polyester resin composition.

Properties of the resulting polyester resin composition are shown in Table 11.

The resulting polyester resin composition obtained in Example 62 exhibited a small content and amount of increase of the cyclic trimer, a small production rate of the linear oligomers and further a sufficiently high total light transmittance, and thus had suitable physical properties for optical films and releasable films.

Examples 63 to 70

Polyester resin compositions were obtained in the same way as in Example 62 except that the ionic liquid to be added was changed as in Table 11. Properties of the resulting polyester resin compositions are shown in Table 11.

The resulting polyester resin compositions obtained in Examples 63 to 70 exhibited a small content and amount of increase of the cyclic trimer, a small production rate of the linear oligomers, and further a sufficiently high total light transmittance, and thus had suitable physical properties for optical films and releasable films.

Example 71

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and then 0.02 parts by weight of germanium dioxide, 0.01 parts by weight of trimethyl phosphate, and 0.01 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a pellet-shaped polymer was obtained.

The resulting pellet-shaped polymer was dried at 160° C. for 6 hours and crystallized, and subjected to solid phase polymerization at 220° C. for 8 hours and at a degree of vacuum of 0.3 Torr to obtain a polyester resin composition.

Properties of the resulting polyester resin composition are shown in Table 11.

The resulting polyester resin composition obtained in Example 71 exhibited a small content and amount of increase of the cyclic trimer, a small production rate of the linear oligomers and further a sufficiently high total light transmittance, and thus had suitable physical properties for optical films and releasable films.

Example 72

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and 0.015 parts by weight of aluminum hydroxide, 0.01 parts by weight of trimethyl phosphate, and 0.01 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a pellet-shaped polymer was obtained.

The resulting pellet-shaped polymer was dried at 160° C. for 6 hours and crystallized, and subjected to solid phase polymerization at 220° C. for 8 hours and at a degree of vacuum of 0.3 Torr to obtain a polyester resin composition.

Properties of the resulting polyester resin composition are shown in Table 11.

The resulting polyester resin composition obtained in Example 72 exhibited a small content and amount of increase of the cyclic trimer, a small production rate of the linear oligomers and further a sufficiently high total light transmittance, and thus had suitable physical properties for optical films and releasable films.

TABLE 11

|  |  | Example 62 | Example 63 | Example 64 | Example 65 | Example 66 | Example 67 |
| --- | --- | --- | --- | --- | --- | --- | --- |
| Ionic Liquid | Type | F | A | B | C | D | E |
|  | Amount of Addition (wt %) | 0.1 | 0.1 | 0.1 | 0.1 | 0.1 | 0.1 |
| Polymerization Catalyst |  | Ti | Ti | Ti | Ti | Ti | Ti |
| Intrinsic Viscosity (IV) |  | 0.81 | 0.80 | 0.80 | 0.79 | 0.80 | 0.81 |
| Amount of COOH Terminal Groups (eq/t) |  | 15.4 | 15.2 | 15.5 | 14.9 | 15.2 | 14.8 |
| C3 Content (wt %) |  | 0.42 | 0.44 | 0.44 | 0.43 | 0.42 | 0.42 |
| ΔC3 (wt %) |  | 0.25 | 0.27 | 0.28 | 0.25 | 0.25 | 0.26 |
| Linear Oligomer Content (ppm) |  | 1380 | 1480 | 1410 | 1440 | 1390 | 1420 |
| Linear Oligomer Production Amount (ppm) |  | 850 | 930 | 880 | 940 | 890 | 860 |
| Production Rate of Linear Oligomers |  | 0.62 | 0.63 | 0.62 | 0.65 | 0.64 | 0.61 |
| Total Light Transmittance (%) |  | 90 | 90 | 89 | 90 | 91 | 90 |
| Surface Roughness Ra (μm) |  | 0.066 | 0.109 | 0.120 | 0.121 | 0.122 | 0.119 |
| Hydrolysis Resistance (ΔCOOH) |  | 184.8 | 39.5 | 40.3 | 38.7 | 39.5 | 38.5 |
| ΔCOOH/COOH |  | 12.0 | 2.6 | 2.6 | 2.6 | 2.6 | 2.6 |
| Gelation Ratio (%) |  | 12.2 | 11.2 | 11.1 | 11.1 | 11.0 | 11.2 |
|  |  | Example 68 | Example 69 | Example 70 | Example 71 | Example 72 |  |
| Ionic Liquid | Type | G | H | I | F | F |  |
|  | Amount of Addition (wt %) | 0.1 | 0.1 | 0.1 | 0.1 | 0.1 |  |
| Polymerization Catalyst |  | Ti | Ti | Ti | Ge | Al |  |
| Intrinsic Viscosity (IV) |  | 0.80 | 0.81 | 0.81 | 0.80 | 0.80 |  |

TABLE 11-continued

| | | | | | |
|---|---|---|---|---|---|
| Amount of COOH Terminal Groups (eq/t) | 14.6 | 15.2 | 15.4 | 15.5 | 15.3 |
| C3 Content (wt %) | 0.43 | 0.44 | 0.42 | 0.41 | 0.42 |
| ΔC3 (wt %) | 0.29 | 0.25 | 0.26 | 0.22 | 0.24 |
| Linear Oligomer Content (ppm) | 1480 | 1430 | 1430 | 1410 | 1450 |
| Linear Oligomer Production Amount (ppm) | 910 | 870 | 920 | 870 | 880 |
| Production Rate of Linear Oligomers | 0.61 | 0.61 | 0.64 | 0.62 | 0.61 |
| Total Light Transmittance (%) | 91 | 90 | 90 | 93 | 91 |
| Surface Roughness Ra (µm) | 0.122 | 0.110 | 0.118 | 0.066 | 0.065 |
| Hydrolysis Resistance (ΔCOOH) | 38.0 | 39.5 | 40.0 | 186.0 | 183.6 |
| ΔCOOH/COOH | 2.6 | 2.6 | 2.6 | 12.0 | 12.0 |
| Gelation Ratio (%) | 11.3 | 11.2 | 11.2 | 12.0 | 12.0 |

Ionic Liquid
A: 1-butyl-3-methylimidazolium acetate
B: 1-butyl-3-methylimidazolium chloride
C: tetrabutyl ammonium bromide
D: tetrabutyl phosphonium bromide
E: trihexyl tetradecyl phosphonium chloride
F: tetrabutyl ammonium methane sulfonate
G: tetrahexyl ammonium bromide
H: 1-ethyl-3-methylimidazolium acetate
I: 1-butyl-4-methylpyridinium bromide Example 73

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and 0.007 parts by weight of tetra-n-butoxytitanium, 0.007 parts by weight of trimethyl phosphate, and 0.01 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a pellet-shaped polymer was obtained.

The resulting pellet-shaped polymer was dried at 160° C. for 6 hours and crystallized, and subjected to solid phase polymerization at 220° C. for 8 hours and at a degree of vacuum of 0.3 Torr. After that, the resulting polymer was subjected to a deactivation treatment at 100° C. for 5 hours in contact with water, and thus a polyester resin composition was obtained.

Properties of the resulting polyester resin composition are shown in Table 12.

The resulting polyester resin composition obtained in Example 73 exhibited a small content and amount of increase of the cyclic trimer, a small production rate of the linear oligomers and further a sufficiently high total light transmittance, and thus had suitable physical properties for optical films and releasable films.

Examples 74 to 81

Polyester resin compositions were obtained in the same way as in Example 73 except that the ionic liquid to be added was changed as in Table 12. Properties of the resulting polyester resin compositions are shown in Table 12.

The resulting polyester resin compositions obtained in Examples 74 to 81 exhibited a small content and amount of increase of the cyclic trimer, a small production rate of the linear oligomers, and further a sufficiently high total light transmittance, and thus had suitable physical properties for optical films and releasable films.

Example 82

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and then 0.02 parts by weight of germanium dioxide, 0.01 parts by weight of trimethyl phosphate, and 0.01 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a pellet-shaped polymer was obtained.

The resulting pellet-shaped polymer was dried at 160° C. for 6 hours and crystallized, and subjected to solid phase polymerization at 220° C. for 8 hours and at a degree of vacuum of 0.3 Torr. After that, the resulting polymer was subjected to a deactivation treatment at 100° C. for 5 hours in contact with water, and thus a polyester resin composition was obtained.

Properties of the resulting polyester resin composition are shown in Table 12.

The resulting polyester resin composition obtained in Example 82 exhibited a small content and amount of increase of the cyclic trimer, a small production rate of the linear oligomers, and further a sufficiently high total light transmittance, and thus had suitable physical properties for optical films and releasable films.

Example 83

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and 0.015 parts by weight of aluminum hydroxide, 0.01 parts by weight of trimethyl phosphate, and 0.01 parts by weight of magnesium acetate tetrahydrate were added, and the mixture was stirred for 5 minutes. Next, 0.1 parts by weight of the ionic liquid F was added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a pellet-shaped polymer was obtained.

The resulting pellet-shaped polymer was dried at 160° C. for 6 hours and crystallized, and subjected to solid phase polymerization at 220° C. for 8 hours and at a degree of vacuum of 0.3 Torr. After that, the resulting polymer was subjected to a deactivation treatment at 100° C. for 5 hours in contact with water, and thus a polyester resin composition was obtained.

Properties of the resulting polyester resin composition are shown in Table 12.

The resulting polyester resin composition obtained in Example 83 exhibited a small content and amount of increase of the cyclic trimer, a small production rate of the linear oligomers and further a sufficiently high total light transmittance, and thus had suitable physical properties for optical films and releasable films.

TABLE 12

|  |  | Example 73 | Example 74 | Example 75 | Example 76 | Example 77 | Example 78 |
|---|---|---|---|---|---|---|---|
| Ionic Liquid | Type | F | A | B | C | D | E |
|  | Amount of Addition (wt %) | 0.1 | 0.1 | 0.1 | 0.1 | 0.1 | 0.1 |
| Polymerization Catalyst |  | Ti | Ti | Ti | Ti | Ti | Ti |
| Intrinsic Viscosity (IV) |  | 0.80 | 0.81 | 0.81 | 0.80 | 0.80 | 0.82 |
| Amount of COOH Terminal Groups (eq/t) |  | 14.8 | 15.1 | 15.2 | 14.9 | 15.2 | 15.3 |
| C3 Content (wt %) |  | 0.41 | 0.42 | 0.40 | 0.42 | 0.41 | 0.42 |
| ΔC3 (wt %) |  | 0.07 | 0.08 | 0.07 | 0.09 | 0.07 | 0.08 |
| Linear Oligomer Content (ppm) |  | 1350 | 1380 | 1420 | 1390 | 1350 | 1360 |
| Linear Oligomer Production Amount (ppm) |  | 650 | 690 | 710 | 700 | 680 | 700 |
| Production Rate of Linear Oligomers |  | 0.48 | 0.50 | 0.50 | 0.50 | 0.50 | 0.51 |
| Total Light Transmittance (%) |  | 91 | 90 | 90 | 89 | 90 | 90 |
| Surface Roughness Ra (μm) |  | 0.066 | 0.109 | 0.120 | 0.121 | 0.122 | 0.119 |
| Hydrolysis Resistance (ΔCOOH) |  | 182.4 | 39.0 | 38.5 | 40.3 | 39.5 | 39.8 |
| ΔCOOH/COOH |  | 12.3 | 2.6 | 2.5 | 2.7 | 2.6 | 2.6 |
| Gelation Ratio (%) |  | 12.3 | 11.3 | 11.2 | 11.2 | 11.1 | 11.3 |

|  |  | Example 79 | Example 80 | Example 81 | Example 82 | Example 83 |
|---|---|---|---|---|---|---|
| Ionic Liquid | Type | G | H | I | F | F |
|  | Amount of Addition (wt %) | 0.1 | 0.1 | 0.1 | 0.1 | 0.1 |

TABLE 12-continued

| | | | | | |
|---|---|---|---|---|---|
| Polymerization Catalyst | Ti | Ti | Ti | Ge | Al |
| Intrinsic Viscosity (IV) | 0.80 | 0.81 | 0.80 | 0.80 | 0.80 |
| Amount of COOH Terminal Groups (eq/t) | 14.9 | 14.8 | 15.1 | 15.2 | 15.3 |
| C3 Content (wt %) | 0.40 | 0.42 | 0.41 | 0.40 | 0.41 |
| ΔC3 (wt %) | 0.07 | 0.08 | 0.09 | 0.07 | 0.07 |
| Linear Oligomer Content (ppm) | 1380 | 1410 | 1390 | 1350 | 1380 |
| Linear Oligomer Production Amount (ppm) | 680 | 730 | 680 | 650 | 680 |
| Production Rate of Linear Oligomers | 0.49 | 0.52 | 0.49 | 0.48 | 0.49 |
| Total Light Transmittance (%) | 89 | 90 | 90 | 93 | 92 |
| Surface Roughness Ra (μm) | 0.122 | 0.110 | 0.118 | 0.066 | 0.066 |
| Hydrolysis Resistance (ΔCOOH) | 39.5 | 39.0 | 39.5 | 182.4 | 182.4 |
| ΔCOOH/COOH | 2.7 | 2.6 | 2.6 | 12.0 | 11.9 |
| Gelation Ratio (%) | 11.4 | 11.3 | 11.3 | 12.1 | 12.1 |

Ionic Liquid
A: 1-butyl-3-methylimidazolium acetate
B: 1-butyl-3-methylimidazolium chloride
C: tetrabutyl ammonium bromide
D: tetrabutyl phosphonium bromide
E: trihexyl tetradecyl phosphonium chloride
F: tetrabutyl ammonium methane sulfonate
G: tetrahexyl ammonium bromide
H: 1-ethyl-3-methylimidazolium acetate
I: 1-butyl-4-methylpyridinium bromide Comparative Example 14

A polyester resin composition was obtained in the same way as in Example 73 except that the ionic liquid was not added. Properties of the resulting polyester resin composition are shown in Table 13.

Although the polyester resin composition obtained in Comparative Example 14 exhibited a sufficiently reduced content and amount of increase of the cyclic trimer, the linear oligomers could not be dissolved in the polymer because the composition did not contain an ionic liquid, resulting in an increase in the amount of produced linear oligomers.

Comparative Examples 15 to 18

Polyester resin compositions were obtained in the same way as in Example 73 except that the ionic liquid to be added was changed as in Table 13. Properties of the resulting polyester resin compositions are shown in Table 13.

The polyester resin compositions obtained in Comparative Examples 15 to 18 had a sufficiently reduced content and amount of increase of the cyclic trimer. However, the linear oligomers could not be dissolved in the polymer because, despite the addition of the ionic liquid, the linear oligomers had a low solubility in the ionic liquid, resulting in an increase in the amount of produced linear oligomers.

Example 84

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and then 0.03 parts by weight of diantimony trioxide, 0.02 parts by weight of trimethyl phosphate, and 0.01 parts by weight of magnesium acetate tetrahydrate were added, and the mixture was stirred for 5 minutes. Next, 0.1 parts by weight of the ionic liquid F was added, and the mixture was stirred for 5 minutes.

While the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.5 was reached, and the reaction system was set at a normal pressure with nitrogen gas. The molten polymer was discharged from the bottom of the polymerization apparatus into cold water in a strand shape and cut. Thus, a pellet-shaped polymer was obtained.

The resulting pellet-shaped polymer was dried at 160° C. for 6 hours and crystallized, and subjected to solid phase polymerization at 220° C. for 8 hours and at a degree of vacuum of 0.3 Torr. After that, the resulting polymer was subjected to a deactivation treatment at 100° C. for 5 hours in contact with water, and thus a polyester resin composition was obtained.

Properties of the resulting polyester resin composition are shown in Table 13.

The resulting polyester resin composition exhibited a small content and amount of increase of the cyclic trimer as well as a small production rate of the linear oligomers.

TABLE 13

|  | | Comparative Example 14 | Comparative Example 15 | Comparative Example 16 | Comparative Example 17 | Comparative Example 18 | Example 84 |
|---|---|---|---|---|---|---|---|
| Ionic Liquid | Type | — | J | K | L | M | F |
|  | Amount of Addition (wt %) | — | 0.1 | 0.1 | 0.1 | 0.1 | 0.1 |
| Polymerization Catalyst | | Ti | Ti | Ti | Ti | Ti | Sb |
| Intrinsic Viscosity (IV) | | 0.81 | 0.81 | 0.81 | 0.80 | 0.81 | 0.80 |
| Amount of COOH Terminal Groups (eq/t) | | 14.8 | 14.9 | 15.5 | 15.2 | 15.3 | 15.2 |
| C3 Content (wt %) | | 0.44 | 0.43 | 0.42 | 0.42 | 0.43 | 0.42 |
| ΔC3 (wt %) | | 0.10 | 0.09 | 0.08 | 0.10 | 0.08 | 0.09 |
| Linear Oligomer Content (ppm) | | 1380 | 1420 | 1390 | 1440 | 1400 | 1390 |
| Linear Oligomer Production Amount (ppm) | | 1290 | 1310 | 1270 | 1260 | 1250 | 720 |
| Production Rate of Linear Oligomers | | 0.93 | 0.92 | 0.91 | 0.88 | 0.89 | 0.52 |
| Total Light Transmittance (%) | | 90 | 90 | 90 | 89 | 90 | 83 |
| Surface Roughness Ra (μm) | | 0.160 | 0.165 | 0.163 | 0.163 | 0.164 | 0.066 |
| Hydrolysis Resistance (ΔCOOH) | | 39.0 | 120.1 | 118.5 | 120.9 | 54.7 | 182.4 |
| ΔCOOH/COOH | | 2.6 | 8.1 | 7.6 | 8.0 | 3.6 | 12.0 |
| Gelation Ratio (%) | | 12.3 | 12.7 | 12.6 | 12.7 | 12.6 | 12.0 |

Ionic Liquid
F: tetrabutyl ammonium methane sulfonate
J: 1-ethyl-3-methylimidazolium bis(trifluoromethane sulfonyl)imide
K: octyldimethyl-2-hydroxyethyl ammonium bis(trifluoromethyl sulfonyl)imide
L: N,N-diethyl-N-(2-methoxyethyl)ammonium tetrafluoroborate
M: N,N-dimethyl-N-(2-methoxyethyl)ammonium bis(trifluoromethane sulfonyl)imide Examples 85 to 91

Polyester resin compositions were obtained in the same way as in Example 73 except that the amount of the ionic liquid to be added was changed as in Table 14. Properties of the resulting polyester resin composition are shown in Table 14.

The polyester resin compositions obtained in Examples 85 and 86 exhibited a small content and amount of increase of the cyclic trimer, a small production rate of the linear oligomers, and a high total light transmittance, and thus had suitable physical properties for optical films and releasable films. However, due to a small amount of the ionic liquid added, in comparison with Example 73, the production rate of the linear oligomers tended to increase.

The resulting polyester resin compositions obtained in Examples 87 to 89 exhibited a small content and amount of increase of the cyclic trimer, a small production rate of the linear oligomers, and a high total light transmittance, and thus had suitable physical properties for optical films and releasable films.

The resulting polyester resin compositions obtained in Examples 90 and 91 exhibited a small content and amount of increase of the cyclic trimer, a small production rate of the linear oligomers, and a high total light transmittance, and thus had suitable physical properties for optical films and releasable films. Due to a large amount of the ionic liquid added, the deterioration in color tone and an increasing tendency in the amount of COOH terminal groups were observed at a negligible level.

Example 92

A polyester resin composition was obtained in the same way as in Example 73 except that the solid phase polymerization time was changed to 5 hours. Properties of the resulting polyester resin composition are shown in Table 14.

The polyester resin composition obtained in Example 92 exhibited a small content and amount of increase of the cyclic trimer, a small production rate of the linear oligomers, and a high total light transmittance, and thus had suitable physical properties for optical films and releasable films. However, due to the short solid phase polymerization time compared to Example 73, the cyclic trimer content tended to increase.

TABLE 14

|  | | Example 85 | Example 86 | Example 87 | Example 88 | Example 89 | Example 90 | Example 91 | Example 92 |
|---|---|---|---|---|---|---|---|---|---|
| Ionic Liquid | Type | F | F | F | F | F | F | F | F |
|  | Amount of Addition (wt %) | 0.01 | 0.05 | 1 | 5 | 10 | 20 | 30 | 0.1 |
| Polymerization Catalyst | | Ti | Ti | Ti | Ti | Ti | Ti | Ti | Ti |
| Intrinsic Viscosity (IV) | | 0.80 | 0.80 | 0.81 | 0.80 | 0.81 | 0.80 | 0.80 | 0.71 |
| Amount of COOH Terminal Groups (eq/t) | | 14.8 | 15.2 | 14.9 | 15.8 | 17.2 | 20.1 | 22.9 | 18.9 |
| C3 Content (wt %) | | 0.44 | 0.42 | 0.43 | 0.44 | 0.42 | 0.44 | 0.44 | 0.62 |
| ΔC3 (wt %) | | 0.08 | 0.09 | 0.08 | 0.09 | 0.10 | 0.12 | 0.12 | 0.10 |
| Linear Oligomer Content (ppm) | | 1380 | 1420 | 1390 | 1440 | 1450 | 1420 | 1390 | 1430 |
| Linear Oligomer Production Amount (ppm) | | 900 | 820 | 650 | 710 | 770 | 820 | 860 | 700 |
| Production Rate of Linear Oligomers | | 0.65 | 0.58 | 0.47 | 0.49 | 0.53 | 0.58 | 0.62 | 0.49 |
| Total Light Transmittance (%) | | 89 | 90 | 89 | 90 | 89 | 90 | 89 | 90 |
| Surface Roughness Ra (μm) | | 0.123 | 0.102 | 0.044 | 0.046 | 0.051 | 0.056 | 0.065 | 0.046 |
| Hydrolysis Resistance (ΔCOOH) | | 88.8 | 152.0 | 196.7 | 221.2 | 240.8 | 287.4 | 332.1 | 249.5 |
| ΔCOOH/COOH | | 6.0 | 10.0 | 13.2 | 14.0 | 14.0 | 14.3 | 14.5 | 13.2 |
| Gelation Ratio (%) | | 12.0 | 12.0 | 11.5 | 11.9 | 11.8 | 11.5 | 11.6 | 11.2 |

Ionic Liquid F: tetrabutyl ammonium methane sulfonate

Example 93

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

To 105 parts by weight (equivalent to 100 parts by weight of the polyester) of the resulting esterification reactant of 255° C. was added 1.4 mol/t (per 1 t by weight of the polyester) of triethyl phosphonoacetate, and the mixture was stirred for 10 minutes. Then, 2.56 mol/t of copper(II) acetate monohydrate and 1.0 part by weight of the ionic liquid A were added, and the mixture was stirred for 5 minutes. After that, 0.40 mol/t of diantimony trioxide was added, and the mixture was transferred to a polymerization apparatus.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.65 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained. Properties of the resulting polyester resin composition are shown in Table 15.

The polyester resin composition obtained in Example 93 contained a Cu compound, resulting in a small gelation ratio. In addition, since the polyester resin composition contained an ionic liquid capable of dissolving the linear oligomers, the amount of produced linear oligomers was small.

Examples 94 to 96

Polyester resin compositions were obtained in the same way as in Example 93 except that the amount of the copper acetate to be added was changed as in Table 15. Properties of the resulting polyester resin compositions are shown in Table 15.

The polyester resin compositions obtained in Examples 94 to 96 contained a Cu compound, resulting in a small gelation ratio. In addition, since the polyester resin compositions contained an ionic liquid capable of dissolving the linear oligomers, the amount of produced linear oligomers was small.

Examples 97 to 99

Polyester resin compositions were obtained in the same way as in Example 93 except that the copper compound or phosphorus compound was changed to the compound as in Table 15. Properties of the resulting polyester resin compositions are shown in Table 15.

The polyester resin compositions obtained in Examples 97 to 99 contained a Cu compound, resulting in a small gelation ratio. In addition, since the polyester resin compositions contained an ionic liquid capable of dissolving the linear oligomers, the amount of produced linear oligomers was small.

TABLE 15

| | | Example 93 | Example 94 | Example 95 | Example 96 | Example 97 | Example 98 | Example 99 |
|---|---|---|---|---|---|---|---|---|
| Additive | Antimony Compound | Diantimony Trioxide | Diantimony Trioxide | Diantimony Trioxide | Diantimony Trioxide | Diantimony Trioxide | Diantimony Trioxide | Diantimony Trioxide |
| | Magnesium/Manganese Compound | — | — | — | — | — | — | — |
| | Copper Compound | Copper (II) Acetate | Copper (II) Acetate | Copper (II) Acetate | Copper (II) Acetate | Copper Stearate | CuI | Copper (II) Acetate |
| | Phosphorus Compound | TEPA | TEPA | TEPA | TEPA | TEPA | TEPA | PA |
| | Ionic Liquid | A | A | A | A | A | A | A |
| Polymer Properties | Contents Sb (mol/t) | 0.8 | 0.8 | 0.8 | 0.8 | 0.8 | 0.8 | 0.8 |
| | Mg (mol/t) | 0 | 0 | 0 | 0 | 0 | 0 | 0 |
| | Mn (mol/t) | 0 | 0 | 0 | 0 | 0 | 0 | 0 |
| | Cu (mol/t) | 2.56 | 0.256 | 0.128 | 5.12 | 2.56 | 2.56 | 2.56 |
| | P (mol/t) | 1.1 | 1.1 | 1.1 | 1.1 | 1.1 | 1.1 | 1.1 |
| | Ionic Liquid (wt %) | 1 | 1 | 1 | 1 | 1 | 1 | 1 |
| | IV | 0.65 | 0.65 | 0.65 | 0.65 | 0.65 | 0.65 | 0.65 |
| | COOH (eq/t) | 21.1 | 20.9 | 21.7 | 20.2 | 21.1 | 21.2 | 21.2 |
| Effects | Linear Oligomer Content (ppm) | 950 | 937 | 971 | 937 | 956 | 920 | 963 |
| | Linear Oligomer Production Amount (ppm) | 380 | 384 | 408 | 384 | 382 | 368 | 385 |
| | Production Rate of Linear Oligomers | 0.40 | 0.41 | 0.42 | 0.41 | 0.40 | 0.40 | 0.40 |
| | Gelation Ratio (%) | 0.3 | 0.9 | 3.5 | 0.2 | 0.4 | 0.3 | 0.3 |
| | Surface Roughness Ra (μm) | 0.070 | 0.075 | 0.078 | 0.071 | 0.071 | 0.069 | 0.070 |
| | Hydrolysis Resistance (ΔCOOH) | 63.3 | 62.7 | 65.1 | 60.6 | 63.3 | 63.6 | 63.6 |
| | ΔCOOH/COOH | 3.0 | 3.0 | 3.0 | 3.0 | 3.0 | 3.0 | 3.0 |
| | C3 Content (wt %) | 1.05 | 1.10 | 1.08 | 1.07 | 1.10 | 1.11 | 1.09 |
| | ΔC3 (wt %) | — | — | — | — | — | — | — |
| | Total Light Transmittance (%) | 85 | 85 | 85 | 85 | 85 | 85 | 85 |

TEPA: triethyl phosphonoacetate
PA: phosphoric acid
Ionic Liquid A: 1-butyl-3-methylimidazolium acetate

Examples 100 to 105, Comparative Example 19

Polyester resin compositions were obtained in the same way as in Example 93 except that the type of the ionic liquid to be added was changed as in Table 16. Properties of the resulting polyester resin compositions are shown in Table 16.

The polyester resin compositions obtained in Examples 100 to 105 contained a Cu compound, resulting in a small gelation ratio. In addition, since the polyester resin compositions contained an ionic liquid, the amount of produced linear oligomers was small.

While the polyester resin composition obtained in Comparative Example 19 exhibited a small gelation ratio because the composition contained a Cu compound, the production ratio of the linear oligomers was large since the ionic liquid used was not capable of dissolving the linear oligomers.

TABLE 16

| | | Example 100 | Example 101 | Example 102 | Example 103 | Example 104 | Example 105 | Comparative Example 19 |
|---|---|---|---|---|---|---|---|---|
| Additive | Antimony Compound | Diantimony Trioxide | Diantimony Trioxide | Diantimony Trioxide | Diantimony Trioxide | Diantimony Trioxide | Diantimony Trioxide | Diantimony Trioxide |
| | Magnesium/Manganese Compound | — | — | — | — | — | — | — |
| | Copper Compound | Copper (II) Acetate | Copper (II) Acetate | Copper (II) Acetate | Copper (II) Acetate | Copper (II) Acetate | Copper (II) Acetate | Copper (II) Acetate |
| | Phosphorus Compound | TEPA | TEPA | TEPA | TEPA | TEPA | TEPA | TEPA |
| | Ionic Liquid | B | C | D | E | F | P | J |
| Polymer Properties | Contents Sb (mol/t) | 0.8 | 0.8 | 0.8 | 0.8 | 0.8 | 0.8 | 0.8 |
| | Mg (mol/t) | 0 | 0 | 0 | 0 | 0 | 0 | 0 |
| | Mn (mol/t) | 0 | 0 | 0 | 0 | 0 | 0 | 0 |
| | Cu (mol/t) | 2.56 | 2.56 | 2.56 | 2.56 | 2.56 | 2.56 | 2.56 |
| | P (mol/t) | 1.1 | 1.1 | 30.6 | 20.3 | 1.1 | 1.1 | 1.1 |
| | Ionic Liquid (wt %) | 1 | 1 | 1 | 1 | 1 | 1 | 1 |
| | IV | 0.65 | 0.65 | 0.65 | 0.65 | 0.65 | 0.65 | 0.65 |
| | COOH (eq/t) | 20.5 | 20.9 | 21.6 | 21.4 | 21.8 | 21 | 22.7 |
| Effects | Linear Oligomer Content (ppm) | 900 | 888 | 872 | 903 | 880 | 870 | 950 |
| | Linear Oligomer Production Amount (ppm) | 360 | 364 | 366 | 370 | 352 | 348 | 750 |
| | Production Rate of Linear Oligomers | 0.40 | 0.41 | 0.42 | 0.41 | 0.40 | 0.40 | 0.79 |
| | Gelation Ratio (%) | 0.3 | 0.3 | 0.4 | 0.4 | 0.3 | 0.3 | 0.4 |
| | Surface Roughness Ra (μm) | 0.087 | 0.091 | 0.088 | 0.091 | 0.042 | 0.057 | 0.165 |
| | Hydrolysis Resistance (ΔCOOH) | 61.5 | 62.7 | 64.8 | 64.2 | 378.1 | 63.0 | 224.5 |
| | ΔCOOH/COOH | 3.0 | 3.0 | 3.0 | 3.0 | 17.3 | 3.0 | 9.9 |
| | C3 Content (wt %) | 1.05 | 1.10 | 1.08 | 1.07 | 1.10 | 1.11 | 1.10 |
| | ΔC3 (wt %) | — | — | — | — | — | — | — |
| | Total Light Transmittance (%) | 85 | 85 | 85 | 85 | 85 | 85 | 85 |

TEPA: triethyl phosphonoacetate
Ionic Liquid
B: 1-butyl-3-methylimidazolium chloride
C: tetrabutyl ammonium bromide
D: tetrabutyl phosphonium bromide
E: trihexyl tetradecyl phosphonium chloride
F: tetrabutyl ammonium methane sulfonate
J: 1-ethyl-3-methylimidazolium bis(trifluoromethane sulfonyl)imide
P: tetrabutyl ammonium benzoate Examples 106 to 110

Polyester resin compositions were obtained in the same way as in Example 93 except that the amount of the ionic liquid to be added was changed as in Table 17. Properties of the resulting polyester resin compositions are shown in Table 17.

The polyester resin compositions obtained in Examples 106 to 110 contained a Cu compound, resulting in a small gelation ratio. In addition, since the polyester resin compositions contained an ionic liquid capable of dissolving the linear oligomers, the amount of produced linear oligomers was small.

TABLE 17

| | | | Example 106 | Example 107 | Example 108 | Example 109 | Example 110 |
|---|---|---|---|---|---|---|---|
| Additive | Antimony Compound | | Diantimony Trioxide | Diantimony Trioxide | Diantimony Trioxide | Diantimony Trioxide | Diantimony Trioxide |
| | Magnesium/Manganese Compound | | — | — | — | — | — |
| | Copper Compound | | Copper (II) Acetate | Copper (II) Acetate | Copper (II) Acetate | Copper (II) Acetate | Copper (II) Acetate |
| | Phosphorus Compound | | TEPA | TEPA | TEPA | TEPA | TEPA |
| | Ionic Liquid | | A | A | A | A | A |
| Polymer Properties | Contents | Sb (mol/t) | 0.8 | 0.8 | 0.8 | 0.8 | 0.8 |
| | | Mg (mol/t) | 0 | 0 | 0 | 0 | 0 |
| | | Mn (mol/t) | 0 | 0 | 0 | 0 | 0 |

TABLE 17-continued

|  |  | Example 106 | Example 107 | Example 108 | Example 109 | Example 110 |
|---|---|---|---|---|---|---|
|  | Cu (mol/t) | 2.56 | 2.56 | 2.56 | 2.56 | 2.56 |
|  | P (mol/t) | 1.1 | 1.1 | 1.1 | 1.1 | 1.1 |
|  | Ionic Liquid (wt %) | 0.02 | 0.05 | 0.1 | 2 | 4 |
|  | IV | 0.65 | 0.65 | 0.65 | 0.65 | 0.65 |
|  | COOH (eq/t) | 21.1 | 21.7 | 21.3 | 21.2 | 31.4 |
| Effects | Linear Oligomer Content (ppm) | 999 | 970 | 885 | 1000 | 943 |
|  | Linear Oligomer Production Amount (ppm) | 672 | 592 | 460 | 410 | 396 |
|  | Production Rate of Linear Oligomers | 0.67 | 0.61 | 0.52 | 0.41 | 0.42 |
|  | Gelation Ratio (%) | 0.3 | 0.4 | 0.3 | 0.5 | 1.8 |
|  | Surface Roughness Ra (μm) | 0.134 | 0.120 | 0.103 | 0.070 | 0.069 |
|  | Hydrolysis Resistance (ΔCOOH) | 65.0 | 64.8 | 66.2 | 65.5 | 90.0 |
|  | ΔCOOH/COOH | 3.1 | 3.0 | 3.1 | 3.1 | 2.9 |
|  | C3 Content (wt %) | 1.05 | 1.10 | 1.08 | 1.07 | 1.10 |
|  | ΔC3 (wt %) | — | — | — | — | — |
|  | Total Light Transmittance (%) | 85 | 85 | 85 | 85 | 85 |

TEPA: triethyl phosphonoacetate
Ionic Liquid A: 1-butyl-3-methylimidazolium acetate

Reference Example 2

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

To 105 parts by weight (equivalent to 100 parts by weight of the polyester) of the resulting esterification reactant of 255° C. was added 1.4 mol/t (per the weight of the polyester) of triethyl phosphonoacetate, and the mixture was stirred for 10 minutes. Then, 2.56 mol/t of copper(II) acetate monohydrate was added, and the mixture was stirred for 5 minutes. After that, 0.40 mol/t of diantimony trioxide was added, and the mixture was transferred to a polymerization apparatus.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.65 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained.

Example 111

The polyester resin obtained in Reference Example 2 was vacuum-dried at 160° C. for 5 hours, and this polyester resin and the ionic liquid A were fed to a twin screw extruder equipped with a vent in a blend ratio of 100 parts by weight to 1.0 part by weight respectively, and melt-extruded at a temperature of 280 degrees. The discharged strand-shaped polymer was cooled in water and cut with a pelletizer to obtain a pellet-shaped polyester resin composition. Properties of the resulting polyester resin composition are shown in Table 18.

Since the resulting polyester resin composition contained an ionic liquid capable of dissolving the linear oligomers, the amount of produced linear oligomers was small; however, since the amount of COOH terminal groups increased due to the melting and kneading, the amount of produced linear oligomers was larger than in Example 93.

Examples 112 to 114

Polyester compositions were obtained in the same way as in Example 93 except that, as shown in Table 18, manganese acetate tetrahydrate instead of copper acetate and phosphoric acid instead of triethyl phosphonoacetate were added, and that the amount of manganese acetate tetrahydrate to be added was changed. Properties of the resulting polyester resin compositions are shown in Table 18.

The polyester resin compositions obtained in Examples 112 to 114 contained a manganese element, resulting in a small gelation ratio. In addition, since the polyester resin compositions contained an ionic liquid, the amount of produced linear oligomers was small.

Example 115

A polyester composition was obtained in the same way as in Example 93 except that, as shown in Table 18, the amount of diantimony trioxide to be added was changed and that phosphoric acid was added as a phosphorus compound instead of triethyl phosphonoacetate. Properties of the resulting polyester resin composition are shown in Table 18.

The resulting polyester resin composition contained a manganese element, resulting in a small gelation ratio. In addition, since the polyester resin composition contained an ionic liquid, the amount of produced linear oligomers was small.

Example 116

A polyester resin composition was obtained in the same way as in Example 112 except that the amount of the ionic liquid A to be added was changed to 0.1 parts by weight. Properties of the resulting polyester resin composition are shown in Table 18.

The polyester resin composition obtained in this Example contained a manganese element, resulting in a small gelation ratio. In addition, since the polyester resin composition contained an ionic liquid, the amount of produced linear oligomers was small.

TABLE 18

|  |  | Example 111 | Example 112 | Example 113 | Example 114 | Example 115 | Example 116 |
|---|---|---|---|---|---|---|---|
| Additive | Antimony Compound | Diantimony Trioxide | Diantimony Trioxide | Diantimony Trioxide | Diantimony Trioxide | Diantimony Trioxide | Diantimony Trioxide |
|  | Magnesium/Manganese Compound | — | Mn Acetate | Mn Acetate | Mn Acetate | Mn Acetate | Mn Acetate |
|  | Copper Compound | Copper (II) Acetate | — | — | — | — | — |
|  | Phosphorus Compound | TEPA | PA | PA | PA | PA | PA |
|  | Ionic Liquid | A | A | A | A | A | A |
| Polymer Properties | Contents Sb (mol/t) | 0.8 | 0.8 | 0.8 | 0.8 | 1.1 | 0.8 |
|  | Mg (mol/t) | 0 | 0 | 0 | 0 | 0 | 0 |
|  | Mn (mol/t) | 0 | 2.56 | 1.26 | 0.63 | 1.26 | 2.56 |
|  | Cu (mol/t) | 2.56 | 0 | 0 | 0 | 0 | 0 |
|  | P (mol/t) | 1.1 | 1.1 | 1.1 | 1.1 | 1.1 | 1.1 |
|  | Ionic Liquid (wt %) | 1 | 1 | 1 | 1 | 1 | 0.1 |
|  | IV | 0.63 | 0.65 | 0.65 | 0.65 | 0.65 | 0.65 |
|  | COOH (eq/t) | 40.5 | 28.6 | 28.4 | 28.3 | 28.2 | 28.7 |
| Effects | Linear Oligomer Content (ppm) | 1352 | 1250 | 1073 | 1048 | 1171 | 1320 |
|  | Linear Oligomer Production Amount (ppm) | 568 | 570 | 440 | 440 | 480 | 550 |
|  | Production Rate of Linear Oligomers | 0.42 | 0.46 | 0.41 | 0.42 | 0.41 | 0.42 |
|  | Gelation Ratio (%) | 0.3 | 2.6 | 4.2 | 4.2 | 4.8 | 2.6 |
|  | Surface Roughness Ra (μm) | 0.108 | 0.097 | 0.072 | 0.075 | 0.074 | 0.122 |
|  | Hydrolysis Resistance (ΔCOOH) | 137.7 | 100.1 | 73.8 | 79.2 | 73.3 | 100.5 |
|  | ΔCOOH/COOH | 3.4 | 3.5 | 2.6 | 2.8 | 2.6 | 3.5 |
|  | C3 Content (wt %) | 1.05 | 1.10 | 1.08 | 1.07 | 1.10 | 1.10 |
|  | ΔC3 (wt %) | — | — | — | — | — | — |
|  | Total Light Transmittance (%) | 85 | 85 | 85 | 85 | 85 | 85 |

TEPA: triethyl phosphonoacetate
PA: phosphoric acid
Ionic Liquid A: 1-butyl-3-methylimidazolium acetate

Example 117

A polyester resin composition was obtained in the same way as in Example 93 except that the amount of antimony trioxide to be added and the amount of manganese acetate tetrahydrate to be added were changed as shown in Table 19, and that triethyl phosphonoacetate was added instead of phosphoric acid as a phosphorus compound. Properties of the resulting polyester resin composition are shown in Table 19.

Since the resulting polyester resin composition contained an ionic liquid capable of dissolving the linear oligomers, the amount of produced linear oligomers was small.

Example 118

A polyester resin composition was obtained in the same way as in Example 93 except that 2.56 mol/t of magnesium acetate tetrahydrate was added instead of copper acetate. Properties of the resulting polyester resin composition are shown in Table 19.

Since the resulting polyester resin composition contained an ionic liquid, the amount of produced linear oligomers was small; however, the gelation ratio was larger than in Example 93.

Comparative Example 20

A polyester resin composition was obtained in the same way as in Example 93 except that the ionic liquid was not added. Properties of the resulting polyester resin composition are shown in Table 19.

The polyester resin composition obtained in Comparative Example 20 contained a copper compound, resulting in a small gelation ratio, but since the polyester resin composition did not contain an ionic liquid, the amount of produced linear oligomers was large.

Comparative Example 21

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

To 105 parts by weight (equivalent to 100 parts by weight of the polyester) of the resulting esterification reactant of 255° C. was added 1.4 mol/t (per the weight of the polyester) of triethyl phosphonoacetate, and the mixture was stirred for 10 minutes. Then, 2.56 mol/t of copper(II) acetate monohydrate was added, and the mixture was stirred for 5 minutes. After that, 0.40 mol/t of diantimony trioxide was added, and the mixture was transferred to a polymerization apparatus.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.50 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained.

The resulting polyester resin composition was dried at 150° C. for 4 hours and crystallized, and subjected to solid phase polymerization for 8 hours at a chip temperature of 220° C. and at a degree of vacuum of 0.3 Torr or less to obtain a polyester resin composition with an intrinsic viscosity of 0.75. Properties of the resulting polyester resin composition are shown in Table 19.

In spite of the solid phase polymerization, the polyester resin composition obtained in Comparative Example 21 exhibited an increased amount of produced linear oligomers since the composition did not contain an ionic liquid.

Comparative Example 22

The polyester resin obtained in Reference Example 2 was vacuum-dried at 160° C. for 5 hours, and this polyester resin and the ionic liquid L were fed to a twin screw extruder equipped with a vent in a blend ratio of 100 parts by weight to 1.0 part by weight respectively, and melt-extruded at a temperature of 280 degrees. The discharged strand-shaped polymer was cooled in water and cut with a pelletizer to obtain a pellet-shaped polyester resin composition. Properties of the resulting polyester resin composition are shown in Table 19.

The polyester resin composition obtained in Comparative Example 22 exhibited an increased amount of COOH terminal groups due to melting and kneading and an increased amount of produced linear oligomers since the ionic liquid contained was not capable of dissolving the linear oligomers.

Comparative Example 23

A polyester resin composition was obtained in the same way as in Example 117 except that the ionic liquid was not added. Properties of the resulting polyester resin composition are shown in Table 19.

The polyester resin composition obtained in Comparative Example 23 did not contain an ionic liquid, and thus the amount of produced linear oligomers increased.

Example 119

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

Then, 105 parts by weight of the resulting esterification reactant of 255° C. (equivalent to 100 parts by weight of PET) was transferred to a polymerization apparatus, and 0.02 parts by weight of trimethyl phosphate was added. The mixture was stirred for 10 minutes. Next, 0.1 parts by weight of the ionic liquid Q was added, and the mixture was stirred for 5 minutes. After that, 0.009 parts by weight of diantimony trioxide was added.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.65 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained. Properties of the resulting polyester resin composition are shown in Table 20.

Since the polyester resin composition obtained in Example 119 contained an ionic liquid capable of dissolving

TABLE 19

| | | | Example 119 | Example 120 | Comparative Example 20 | Comparative Example 21 | Comparative Example 22 | Comparative Example 23 |
|---|---|---|---|---|---|---|---|---|
| Additive | Antimony Compound | | Diantimony Trioxide | Diantimony Trioxide | Diantimony Trioxide | Diantimony Trioxide | Diantimony Trioxide | Diantimony Trioxide |
| | Magnesium/Manganese Compound | | Mn Acetate | Mg Acetate | — | — | — | Mn Acetate |
| | Copper Compound | | — | — | Copper (II) Acetate | Copper (II) Acetate | Copper (II) Acetate | — |
| | Phosphorus Compound | | TEPA | TEPA | TEPA | TEPA | TEPA | TEPA |
| | Ionic Liquid | | A | A | — | — | L | — |
| Polymer Properties | Contents | Sb (mol/t) | 1.36 | 0.8 | 0.8 | 0.8 | 0.8 | 1.36 |
| | | Mg (mol/t) | 0 | 2.56 | 0 | 0 | 0 | 0 |
| | | Mn (mol/t) | 1.26 | 0 | 0 | 0 | 0 | 1.26 |
| | | Cu (mol/t) | 0 | 0 | 2.56 | 2.56 | 2.56 | 0 |
| | | P (mol/t) | 1.1 | 1.1 | 1.1 | 1.1 | 1.1 | 1.1 |
| | | Ionic Liquid (wt %) | 1 | 1 | 0 | 0 | 1 | 0 |
| | IV | | 0.65 | 0.65 | 0.65 | 0.75 | 0.63 | 0.65 |
| | COOH (eq/t) | | 29.4 | 29.6 | 23.5 | 15.0 | 50.2 | 29.1 |
| Effects | Linear Oligomer Content (ppm) | | 1375 | 1198 | 1122 | 1034 | 1105 | 1400 |
| | Linear Oligomer Production Amount (ppm) | | 550 | 515 | 808 | 734 | 850 | 1080 |
| | Production Rate of Linear Oligomers | | 0.40 | 0.43 | 0.72 | 0.71 | 0.77 | 0.77 |
| | Gelation Ratio (%) | | 9.0 | 18.8 | 0.3 | 0.4 | 0.4 | 9.0 |
| | Surface Roughness Ra (μm) | | 0.084 | 0.084 | 0.162 | 0.160 | 0.163 | 0.163 |
| | Hydrolysis Resistance (ΔCOOH) | | 76.4 | 103.6 | 75.0 | 45.0 | 225.8 | 82.0 |
| | ΔCOOH/COOH | | 2.6 | 3.5 | 3.2 | 3.0 | 4.5 | 2.8 |
| | C3 Content (wt %) | | 1.10 | 1.10 | 1.05 | 1.10 | 1.09 | 1.07 |
| | ΔC3 (wt %) | | — | — | — | — | — | — |
| | Total Light Transmittance (%) | | 85 | 85 | 85 | 85 | 85 | 85 |

TEPA: triethyl phosphonoacetate
Ionic Liquid
A: 1-butyl-3-methylimidazolium acetate
L: N,N-diethyl-N- (2-methoxyethyl)ammonium tetrafluoroborate the acid component monomer and the oligomers of the polyester, the amounts of produced acid component monomer and produced oligomers were small. The surface roughness Ra of the capture plate was also small.

Example 120

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

After 105 parts by weight of the resulting esterification reactant of 255° C. (equivalent to 100 parts by weight of PET) was transferred to a polymerization apparatus, a mixture solution of 0.011 parts by weight of sodium dihydrogen phosphate dihydrate/0.007 parts by weight of phosphoric acid/ethylene glycol was added, and the mixture was stirred for 5 minutes. Then, 0.1 parts by weight of the ionic liquid A, 0.01 parts by weight of diantimony trioxide, and 0.02 parts by weight of manganese acetate tetrahydrate were added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.65 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained. Properties of the resulting polyester resin composition are shown in Table 20.

Since the polyester resin composition obtained in Example 120 contained an ionic liquid capable of dissolving the acid component monomer and the oligomers of the polyester, the amounts of produced acid component monomer and produced oligomers were small. The surface roughness Ra of the capture plate was also small. In addition, the polyester resin composition exhibited a small gelation ratio due to the manganese element contained therein, and also exhibited good hydrolysis resistance due to the alkali metal phosphate salt contained therein.

Examples 121 to 125

Polyester resin compositions were obtained in the same way as in Example 120 except that the ionic liquid to be added was changed as in Table 20. Properties of the resulting polyester resin compositions are shown in Table 20.

Since the polyester resin compositions obtained in Examples 121 to 125 contained an ionic liquid capable of dissolving the acid component monomer and the oligomers of the polyester, the amounts of produced acid component monomer and produced oligomers were small. The surface roughness Ra of the capture plate was also small. In addition, the polyester resin composition exhibited a small gelation ratio due to the manganese element contained therein, and also exhibited good hydrolysis resistance due to the alkali metal phosphate salt contained therein.

TABLE 20

| | | Example 119 | Example 120 | Example 121 | Example 122 | Example 123 | Example 124 | Example 125 |
|---|---|---|---|---|---|---|---|---|
| Ionic Liquid | type | Q | A | F | C | Q | P | E |
| | Content (wt %) | 0.1 | 0.1 | 0.1 | 0.1 | 0.1 | 0.1 | 0.1 |
| Polymer Properties | IV | 0.65 | 0.65 | 0.65 | 0.65 | 0.65 | 0.65 | 0.65 |
| | COOH (eq/t) | 28.6 | 21.5 | 19.8 | 21.6 | 21.8 | 21.5 | 21.7 |
| Acid Component Monomer/Oligomer | TPA (ppm) | 731 | 639 | 631 | 635 | 632 | 632 | 640 |
| Contents After Melting Treatment | MHET (ppm) | 387 | 336 | 333 | 330 | 335 | 335 | 332 |
| | BHET (ppm) | 145 | 126 | 126 | 125 | 125 | 125 | 125 |
| Monomer/ | TPA (ppm) | 350 | 307 | 299 | 304 | 303 | 303 | 307 |
| Oligomer Production Amounts | MHET (ppm) | 198 | 170 | 170 | 172 | 171 | 171 | 168 |
| | BHET (ppm) | 75 | 65 | 65 | 65 | 65 | 65 | 65 |
| Production rate of Acid Component Monomer | | 0.48 | 0.48 | 0.47 | 0.48 | 0.48 | 0.48 | 0.48 |
| Production Rate of Oligomers | | 0.51 | 0.51 | 0.51 | 0.52 | 0.51 | 0.51 | 0.51 |
| Surface Roughness Ra (μm) | | 0.073 | 0.102 | 0.071 | 0.112 | 0.065 | 0.076 | 0.113 |
| Hydrolysis Resistance (ΔCOOH) | | 85.8 | 49.5 | 57.4 | 51.8 | 48.0 | 47.3 | 52.1 |
| ΔCOOH/COOH | | 3.0 | 2.3 | 2.9 | 2.4 | 2.2 | 2.2 | 2.4 |
| C3 Content (wt %) | | 1.09 | 1.09 | 1.08 | 1.08 | 1.09 | 1.09 | 1.10 |
| ΔC3 (wt %) | | — | — | — | — | — | — | — |
| Gelation Ratio (%) | | 7.4 | 4.1 | 4.9 | 4.3 | 4.5 | 4.8 | 4.2 |
| Total Light Transmittance (%) | | 85 | 85 | 85 | 85 | 85 | 85 | 85 |

TPA: terephthalic acid
MHET: monohydroxyethyl terephthalate
BHET: bishydroxyethyl terephthalate
Ionic Liquid
A: 1-butyl-3-methylimidazolium acetate
C: tetrabutyl ammonium bromide
E: trihexyl tetradecyl phosphonium chloride
F: tetrabutyl ammonium methane sulfonate
P: tetrabutyl ammonium benzoate
Q: tetrabutyl ammonium salicylate Example 126

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

After 105 parts by weight of the resulting esterification reactant of 255° C. (equivalent to 100 parts by weight of PET) was transferred to a polymerization apparatus, a mixture solution of 0.011 parts by weight of sodium dihydrogen phosphate dihydrate/0.007 parts by weight of phosphoric acid/ethylene glycol was added, and the mixture was stirred for 5 minutes. Then, 0.1 parts by weight of the ionic liquid A, 0.01 parts by weight of diantimony trioxide, and 0.016 parts by weight of copper(II) acetate monohydrate were added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.65 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained. Properties of the resulting polyester resin composition are shown in Table 21.

Since the polyester resin composition obtained in Example 126 contained an ionic liquid capable of dissolving the acid component monomer and the oligomers of the polyester, the amounts of produced acid component monomer and produced oligomers were small. The surface roughness Ra of the capture plate was also small. In addition, the polyester resin composition exhibited a small gelation ratio due to the copper element contained therein, and also exhibited good hydrolysis resistance due to the alkali metal phosphate salt contained therein.

Examples 127 to 131

Polyester resin compositions were obtained in the same way as in Example 126 except that the ionic liquid to be added was changed as in Table 21. Properties of the resulting polyester resin compositions are shown in Table 21.

Since the polyester resin compositions obtained in Examples 127 to 131 contained an ionic liquid capable of dissolving the acid component monomer and the oligomers of the polyester, the amounts of produced acid component monomer and produced oligomers were small. The surface roughness Ra of the capture plate was also small. In addition, the polyester resin composition exhibited a small gelation ratio due to the copper element contained therein, and also exhibited good hydrolysis resistance due to the alkali metal phosphate salt contained therein.

TABLE 21

| | | Example 126 | Example 127 | Example 128 | Example 129 | Example 130 | Example 131 |
|---|---|---|---|---|---|---|---|
| Ionic Liquid | type | A | F | C | Q | P | E |
| | Content (wt %) | 0.1 | 0.1 | 0.1 | 0.1 | 0.1 | 0.1 |
| Polymer Properties | IV | 0.65 | 0.65 | 0.65 | 0.65 | 0.65 | 0.65 |
| | COOH (eq/t) | 18.8 | 19.2 | 19.0 | 19.4 | 18.6 | 19.2 |
| Acid Component Monomer/Oligomer Contents After Melting Treatment | TPA (ppm) | 552 | 544 | 548 | 546 | 546 | 552 |
| | MHET (ppm) | 290 | 287 | 284 | 289 | 289 | 287 |
| | BHET (ppm) | 109 | 109 | 108 | 108 | 108 | 107 |
| Monomer/ Oligomer Production Amounts | TPA (ppm) | 265 | 258 | 263 | 261 | 261 | 265 |
| | MHET (ppm) | 147 | 147 | 149 | 148 | 148 | 145 |
| | BHET (ppm) | 56 | 56 | 56 | 56 | 56 | 56 |
| Production rate of Acid Component Monomer | | 0.48 | 0.47 | 0.48 | 0.48 | 0.48 | 0.48 |
| Production Rate of Oligomers | | 0.51 | 0.51 | 0.52 | 0.51 | 0.51 | 0.51 |
| Surface Roughness Ra (μm) | | 0.102 | 0.069 | 0.112 | 0.062 | 0.070 | 0.113 |
| Hydrolysis Resistance (ΔCOOH) | | 50.8 | 55.7 | 51.3 | 52.4 | 50.2 | 51.8 |
| ΔCOOH/COOH | | 2.7 | 2.9 | 2.7 | 2.7 | 2.7 | 2.7 |
| C3 Content (wt %) | | 1.09 | 1.08 | 1.08 | 1.09 | 1.09 | 1.10 |
| C3 (wt %) | | — | — | — | — | — | — |
| Gelation Ratio (%) | | 0.4 | 0.6 | 0.5 | 0.2 | 0.5 | 0.4 |
| Total Light Transmittance (%) | | 85 | 85 | 85 | 85 | 85 | 85 |

TPA: terephthalic acid
MHET: monohydroxyethyl terephthalate
BHET: bishydroxyethyl terephthalate
Ionic Liquid
A: 1-butyl-3-methylimidazolium acetate
C: tetrabutyl ammonium bromide
E: trihexyl tetradecyl phosphonium chloride
F: tetrabutyl ammonium methane sulfonate
P: tetrabutyl ammonium benzoate
Q: tetrabutyl ammonium salicylate Example 132

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

After 105 parts by weight of the resulting esterification reactant of 255° C. (equivalent to 100 parts by weight of PET) was transferred to a polymerization apparatus, a mixture solution of 0.011 parts by weight of sodium dihydrogen phosphate dihydrate/0.007 parts by weight of phosphoric acid/ethylene glycol was added, and the mixture was stirred for 5 minutes. Then, 0.1 parts by weight of the ionic liquid F, 0.01 parts by weight of diantimony trioxide, and 0.046 parts by weight of manganese acetate tetrahydrate were added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.65 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained. Properties of the resulting polyester resin composition are shown in Table 22.

Since the polyester resin composition obtained in Example 132 contained an ionic liquid capable of dissolving the acid component monomer and the oligomers of the polyester, the amounts of produced acid component monomer and produced oligomers were small. The surface roughness Ra of the capture plate was also small. In addition, the polyester resin composition exhibited a small gelation ratio due to the manganese element contained therein, and also exhibited good hydrolysis resistance due to the alkali metal phosphate salt contained therein.

Example 133

A polyester resin composition was obtained in the same way as in Example 132 except that the amount of manganese acetate tetrahydrate to be added was changed to 0.006 parts by weight. Properties of the resulting polyester resin composition are shown in Table 22.

Since the polyester resin composition obtained in Example 133 contained an ionic liquid capable of dissolving the acid component monomer and the oligomers of the polyester, the amounts of produced acid component monomer and produced oligomers were small. The surface roughness Ra of the capture plate was also small. In addition, the polyester resin composition exhibited a small gelation ratio due to the manganese element contained therein, and also exhibited good hydrolysis resistance due to the alkali metal phosphate salt contained therein.

Example 134

A polyester resin composition was obtained in the same way as in Example 132 except that 0.032 parts by weight of copper acetate monohydrate was added instead of manganese acetate tetrahydrate. Properties of the resulting polyester resin composition are shown in Table 22.

Since the polyester resin composition obtained in Example 134 contained an ionic liquid capable of dissolving the acid component monomer and the oligomers of the polyester, the amounts of produced acid component monomer and produced oligomers were small. The surface roughness Ra of the capture plate was also small. In addition, the polyester resin composition exhibited a small gelation ratio due to the copper element contained therein, and also exhibited good hydrolysis resistance due to the alkali metal phosphate salt contained therein.

Example 135

A polyester resin composition was obtained in the same way as in Example 132 except that 0.032 parts by weight of copper acetate monohydrate was added instead of manganese acetate tetrahydrate. Properties of the resulting polyester resin composition are shown in Table 22.

Since the polyester resin composition obtained in Example 135 contained an ionic liquid capable of dissolving the acid component monomer and the oligomers of the polyester, the amounts of produced acid component monomer and produced oligomers were small. The surface roughness Ra of the capture plate was also small. In addition, the polyester resin composition exhibited a small gelation ratio due to the copper element contained, and also exhibited good hydrolysis resistance due to the alkali metal phosphate salt contained.

Example 136

To an esterification reactor charged with 105 parts by weight of bishydroxyethyl terephthalate melted at 255° C., a slurry composed of 86 parts by weight of terephthalic acid and 37 parts by weight of ethylene glycol (1.15 times the amount of terephthalic acid (mol)) was added gradually to proceed the esterification reaction. The temperature inside the reaction system was controlled at 245 to 255° C., and the esterification reaction was considered to be over when the reaction ratio reached 95%.

After 105 parts by weight of the resulting esterification reactant of 255° C. (equivalent to 100 parts by weight of PET) was transferred to a polymerization apparatus, a mixture solution of 0.011 parts by weight of sodium dihydrogen phosphate dihydrate/0.007 parts by weight of phosphoric acid/ethylene glycol was added, and the mixture was stirred for 5 minutes. Then, 0.1 parts by weight of the ionic liquid F, 0.01 parts by weight of diantimony trioxide, and 0.02 parts by weight of manganese acetate tetrahydrate were added, and the mixture was stirred for 5 minutes.

After that, while the temperature inside the polymerization apparatus was gradually raised to 290° C., the pressure inside the polymerization apparatus was gradually reduced from a normal pressure to 133 Pa or less, and ethylene glycol was distilled. The reaction was finished when the melt viscosity corresponding to the intrinsic viscosity of 0.55 was reached, and the reaction system was set at a normal pressure with nitrogen gas. The molten polymer was discharged from the bottom of the polymerization apparatus into cold water in a strand shape and cut. Thus, a pellet-shaped polyester resin composition was obtained.

The resulting pellet-shaped polymer was dried at 160° C. for 6 hours and crystallized, and subjected to solid phase polymerization at 230° C. for 8 hours and at a degree of vacuum of 0.3 Torr to obtain a polyester resin composition. Properties of the resulting polyester resin composition are shown in Table 22.

Since the polyester resin composition obtained in Example 136 contained an ionic liquid capable of dissolving the acid component monomer and the oligomers of the polyester, the amounts of produced acid component monomer and produced oligomers were small. The surface roughness Ra of the capture plate was also small. In addition, the polyester resin composition exhibited a small gelation ratio due to the manganese element contained therein, and also exhibited good hydrolysis resistance due to the alkali metal phosphate salt contained therein. In addition, because the solid phase polymerization was performed, the cyclic oligomer content decreased, and hydrolysis resistance also improved further.

Example 137

A polyester resin composition was obtained in the same way as in Example 136 except that 0.016 parts by weight of copper acetate monohydrate was added instead of manganese acetate tetrahydrate. Properties of the resulting polyester resin composition are shown in Table 22.

Since the polyester resin composition obtained in Example 137 contained an ionic liquid capable of dissolving the acid component monomer and the oligomers of the polyester, the amounts of produced acid component monomer and produced oligomers were small. The surface roughness Ra of the capture plate was also small. In addition, the polyester resin composition exhibited a small gelation ratio due to the copper element contained therein, and also exhibited good hydrolysis resistance due to the alkali metal phosphate salt contained therein. In addition, because the solid phase polymerization was performed, the cyclic oligomer content decreased, and hydrolysis resistance also improved further.

TABLE 22

| | | Example 132 | Example 133 | Example 134 | Example 135 | Example 136 | Example 137 |
|---|---|---|---|---|---|---|---|
| Ionic Liquid | type | F | F | F | F | F | F |
| | Content (wt %) | 0.1 | 0.1 | 0.1 | 0.1 | 0.1 | 0.1 |
| Polymer Properties | IV | 0.65 | 0.65 | 0.65 | 0.65 | 0.80 | 0.80 |
| | COOH (eq/t) | 21.3 | 19.3 | 17.8 | 17.5 | 14.5 | 13.4 |
| Acid Component Monomer/Oligomer Contents After Melting Treatment | TPA (ppm) | 643 | 623 | 538 | 549 | 568 | 490 |
| | MHET (ppm) | 345 | 333 | 287 | 280 | 300 | 259 |
| | BHET (ppm) | 129 | 126 | 109 | 110 | 114 | 98 |
| Monomer/ Oligomer Production Amounts | TPA (ppm) | 334 | 299 | 258 | 258 | 269 | 232 |
| | MHET (ppm) | 185 | 170 | 147 | 148 | 153 | 132 |
| | BHET (ppm) | 69 | 65 | 56 | 55 | 58 | 50 |
| Production rate of Acid Component Monomer | | 0.52 | 0.48 | 0.48 | 0.47 | 0.47 | 0.47 |
| Production Rate of Oligomers | | 0.54 | 0.51 | 0.51 | 0.52 | 0.51 | 0.51 |
| Surface Roughness Ra (μm) | | 0.078 | 0.072 | 0.069 | 0.069 | 0.069 | 0.069 |
| Hydrolysis Resistance (ΔCOOH) | | 57.4 | 57.4 | 55.7 | 55.7 | 26.1 | 30.8 |
| ΔCOOH/COOH | | 2.7 | 3.0 | 3.1 | 3.2 | 1.8 | 2.3 |
| C3 Content (wt %) | | 1.08 | 1.08 | 1.08 | 1.08 | 0.40 | 0.40 |
| ΔC3 (wt %) | | — | — | — | — | 0.23 | 0.23 |
| Gelation Ratio (%) | | 4.9 | 4.8 | 0.6 | 0.6 | 4.6 | 0.4 |
| Total Light Transmittance (%) | | 85 | 85 | 85 | 85 | 85 | 85 |

TPA: terephthalic acid
MHET: monohydroxyethyl terephthalate
BHET: bishydroxyethyl terephthalate
Ionic Liquid F: tetrabutyl ammonium methane sulfonate

The invention claimed is:

1. A polyester resin composition comprising:
   1) a polyester consisting essentially of polyethylene terephthalate,
   2) an ionic liquid selected from the group consisting of tetrabutyl ammonium benzoate, tetrabutyl ammonium salicylate and a combination thereof, and
   3) a copper compound selected from the group consisting of copper(I) oxide, copper(II) oxide, lithium dimethylcuprate, lithium dibutylcuprate, copper(I) acetate, copper(II) acetate, copper benzoate, copper carbonate, copper chloride, copper bromide and copper iodide;
   wherein a surface roughness Ra of a glass plate having scattered products derived from the polyester resin composition attached thereto is less than 0.150 μm as measured when a sample of the polyester resin composition is melted at 300° C. for 60 minutes under a nitrogen atmosphere, cooled and thermally treated at 220° C. for 8 hours to form the scattered products attached to the glass plate, the glass plate having an initial surface roughness Ra of 0.010 μm, and
   a gelation ratio after a 6-hour melting treatment at 300° C. under an atmosphere with an oxygen concentration of 1% is 5% or less.

2. The polyester resin composition according to claim 1, wherein the ionic liquid content is 0.01 to 20 wt % based on the polyester resin.

3. The polyester resin composition according to claim 1, wherein pKa of a conjugate acid of an anion in the ionic liquid is greater than −10.

4. The polyester resin composition according to claim 1, wherein an anion molecular weight in the ionic liquid is 270 or less.

* * * * *